United States Patent
DeHaemer et al.

(10) Patent No.: US 10,552,270 B2
(45) Date of Patent: Feb. 4, 2020

(54) SYSTEMS AND METHODS FOR IN-FIELD CORE FAILOVER

(71) Applicant: Intel Corporation, Santa Clara, CA (US)

(72) Inventors: Eric J. DeHaemer, Shrewsbury, MA (US); Arijit Biswas, Holden, MA (US); Reid J. Riedlinger, Wellington, CO (US); Ian M. Steiner, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 15/388,146

(22) Filed: Dec. 22, 2016

(65) Prior Publication Data

US 2018/0181474 A1  Jun. 28, 2018

(51) Int. Cl.
*G06F 11/00* (2006.01)
*G06F 11/20* (2006.01)

(52) U.S. Cl.
CPC ...... *G06F 11/2028* (2013.01); *G06F 11/2041* (2013.01)

(58) Field of Classification Search
CPC .................. G06F 11/2028; G06F 11/2041
USPC .......................................................... 714/13
See application file for complete search history.

(56) References Cited

U.S. PATENT DOCUMENTS

| 4,325,120 A * | 4/1982 | Colley .................... G06F 9/546 711/202 |
| 6,550,020 B1 * | 4/2003 | Floyd .................. G06F 11/1417 714/10 |
| 7,251,746 B2 * | 7/2007 | Fox ..................... G06F 11/2023 714/11 |
| 7,734,952 B1 * | 6/2010 | Hoffman ............. G06F 11/2025 714/10 |
| 10,102,050 B2 * | 10/2018 | Kris .................... G01R 31/2851 |
| 2006/0036889 A1 * | 2/2006 | Arai ...................... G06F 11/203 714/1 |
| 2006/0212677 A1 * | 9/2006 | Fossum ................. G06F 1/3237 712/1 |
| 2012/0166764 A1 * | 6/2012 | Henry ................. G06F 9/30076 712/43 |
| 2016/0246510 A1 * | 8/2016 | Rothman .............. G06F 3/0607 |

* cited by examiner

*Primary Examiner* — Yair Leibovich
(74) *Attorney, Agent, or Firm* — Alliance IP, LLC

(57) ABSTRACT

A multicore processor may include multiple processing cores that were previously designated as active cores and at least one processing core that was previously designated as a functional spare. The processor may include an interface to receive, during operation of the processor in an end-user environment, a request to change the designation of at least one of the processing cores. The processor may be to store, into a desired cores configuration data structure in response to the request, data representing a bitmask that reflects the requested change, and to execute a reset sequence. During the reset sequence, the processor may activate, dependent on the bitmask, a processing core previously designated as a functional spare, or may deactivate, dependent on the bitmask, a processing core previously designated as an active core. The processor may include a predetermined maximum number of active cores and a predetermined minimum number of functional spares.

19 Claims, 19 Drawing Sheets

SYSTEMS AND METHODS FOR IN-FIELD CORE FAILOVER

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. In order to take advantage of multiprocessor systems, code to be executed may be separated into multiple threads for execution by various processing entities. Each thread may be executed in parallel with one another. Pipelining of applications may be implemented in systems in order to more efficiently execute applications. Instructions as they are received on a processor may be decoded into terms or instruction words that are native, or more native, for execution on the processor. Each processor may include a cache or multiple caches. Processors may be implemented in a system on chip.

DESCRIPTION OF THE FIGURES

Various embodiments of the present disclosure are illustrated by way of example and not limitation in the Figures of the accompanying drawings, in which like references indicate similar elements, and in which.

DETAILED DESCRIPTION

Figure 1A:
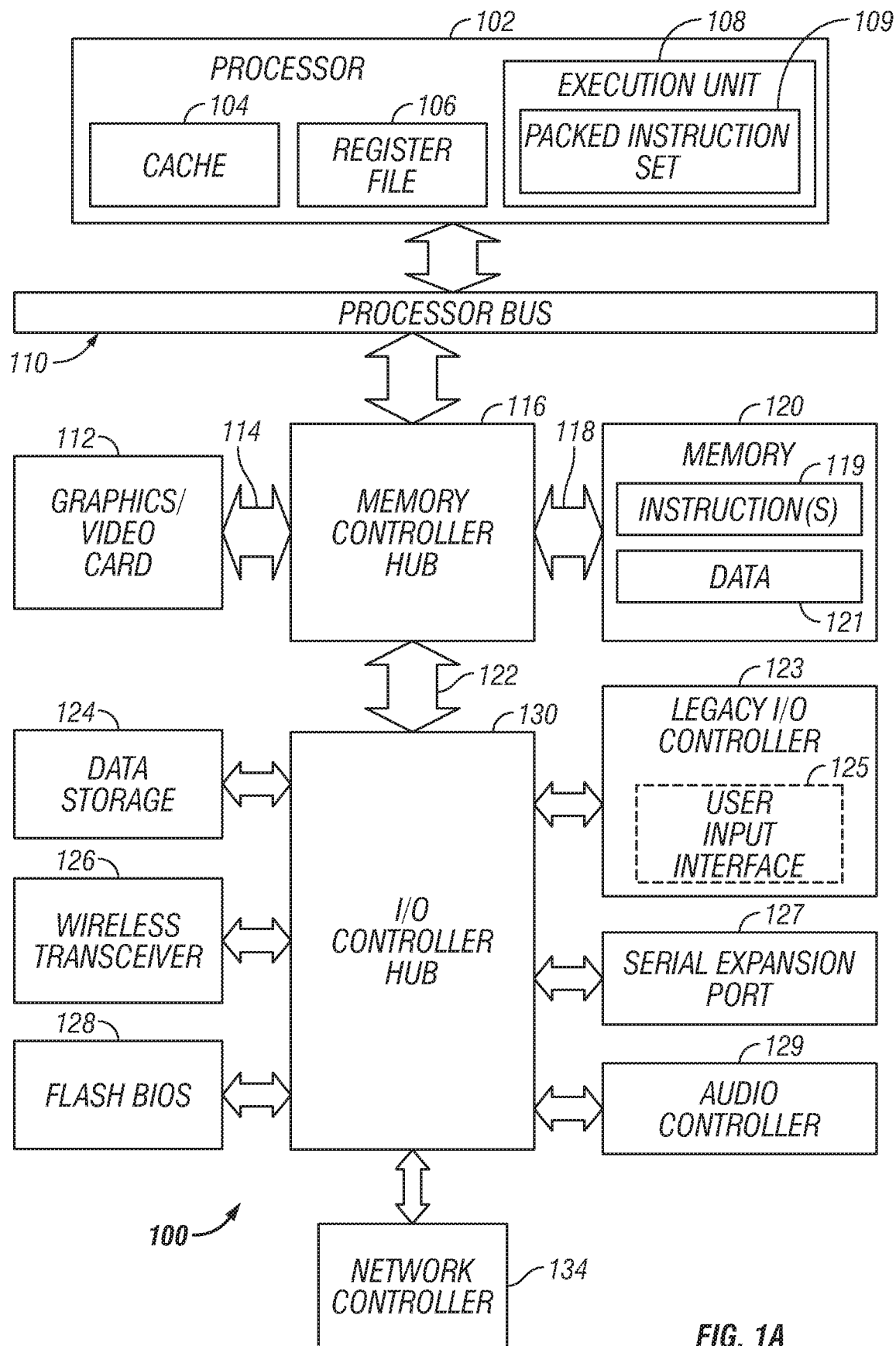
FIG. 1A is a block diagram of an exemplary computer system formed with a processor that may include execution units to execute an instruction, in accordance with some embodiments of the present disclosure.

The following description describes circuitry and logic for implementing in-field core failover in a processing apparatus. Such a processing apparatus may include an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that other embodiments may be practiced without such specific details. Additionally, some well-known structures, circuits, and the like have not been shown in detail to avoid unnecessarily obscuring the example embodiments of the present disclosure included herein.

References in the specification to "one embodiment," "an embodiment," "an example embodiment," etc., indicate that the embodiment described may include a particular feature, structure, or characteristic. However, not all embodiments of the present disclosure necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such a feature, structure, or characteristic in connection with other embodiments of the disclosure, whether or not such a connection is explicitly described.

Although some example embodiments are described with reference to a processor, other embodiments may be applicable to other types of integrated circuits and logic devices. Similar techniques and teachings of various embodiments of the present disclosure may be applied to other types of circuits or semiconductor devices that may benefit from higher pipeline throughput and improved performance. The teachings of the example embodiments of the present disclosure may be applicable to any processor or machine that performs data manipulations. However, other embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the examples below describe instruction handling and distribution in the context of execution units and logic circuits, other embodiments of the present disclosure may be accomplished by way of data or instructions stored on a machine-readable, tangible medium, which when performed by a machine cause the machine to perform functions consistent with at least one embodiment of the disclosure. In some embodiments, functions associated with various embodiments of the present disclosure may be embodied in machine-executable instructions. The instructions may be used to cause a general-purpose or special-purpose processor that may be programmed with the instructions to perform the operations of the present disclosure. Some embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, operations of some embodiments of the present disclosure might be performed by specific hardware components that contain fixed-function logic for performing the operations, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be referred to generically as widget 101.

Instructions used to program logic to perform some embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion of a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed.

In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with some embodiments of the present disclosure. System 100 may include a component, such as a processor 102, to employ execution units including logic to perform algorithms for processing data, in accordance with the present disclosure, such as in the example embodiments described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments of the present disclosure are not limited to computer systems. Some embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Some embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions 119 and/or data 121 represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for storage of instructions 119 and data 121 and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller 129, firmware hub (flash BIOS) 128, wireless transceiver 126, data storage 124, legacy I/O controller 123 containing user input interface 125 (which may include a keyboard interface), a serial expansion port 127 such as Universal Serial Bus (USB), and a network controller 134. Data storage device 124 may comprise a hard disk drive, a floppy disk drive, a CD-ROM device, a flash memory device, or other mass storage device.

In another example system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
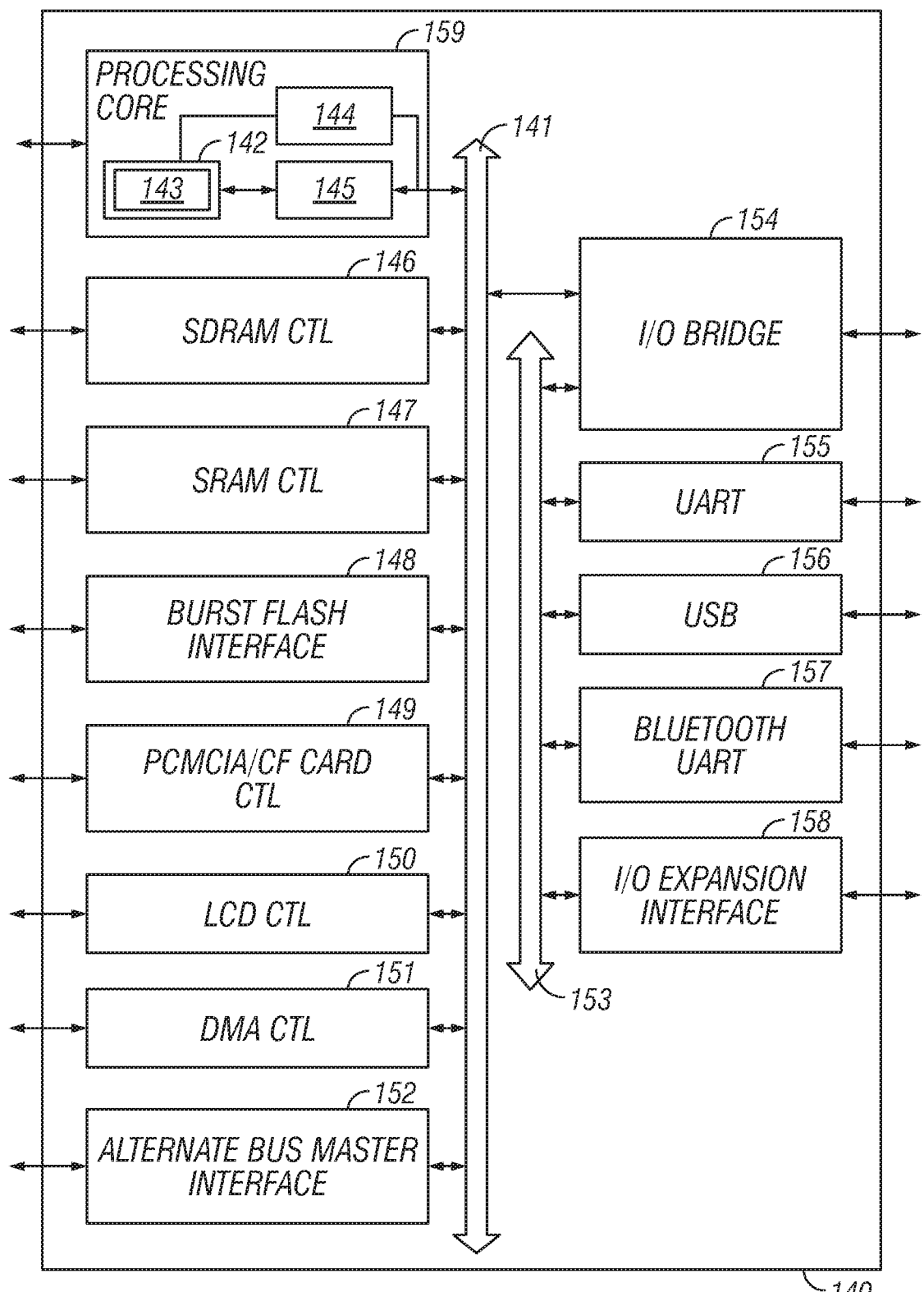
FIG. 1B illustrates a data processing system, in accordance with some embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
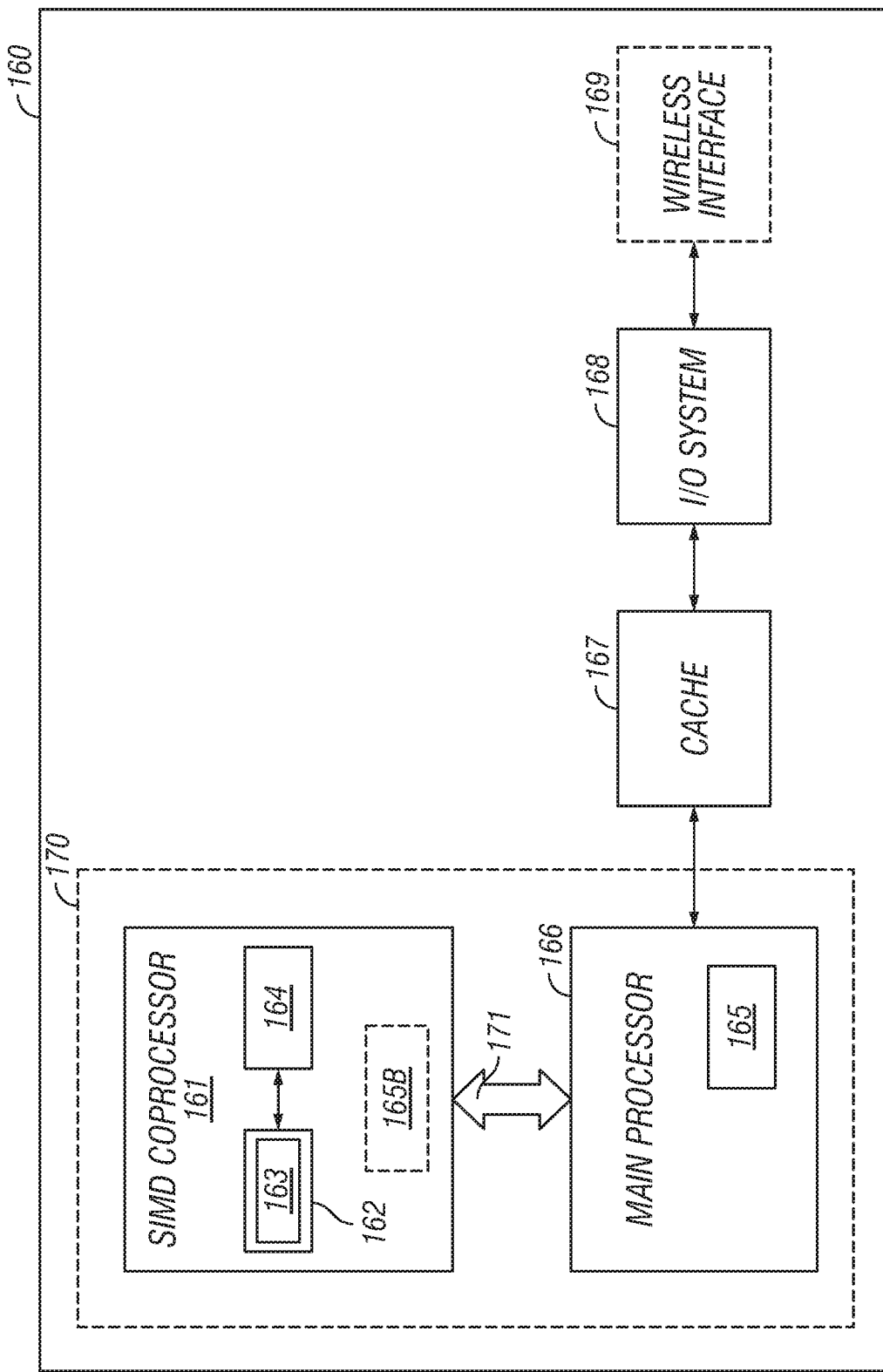
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165 to recognize instructions of instruction set 163 including instructions in accordance with one embodiment for execution by execution unit 162. In other embodiments, SIMD coprocessor 161 also comprises at least part of decoder 165 (shown as 165B) to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

The realities of decreased reliability in sub-14 nm technology generations may require increased levels of resiliency and recovery in the field. In these technologies, guard-banding and screening through functional testing and characterization at manufacturing may no longer be sufficient to catch and prevent all failures from escaping into production parts. The addition of redundant capacity within multicore processors, for example, has allowed individual parts that experience functional or characterization failures in one or more processing cores to be configured, at the manufacturing facility, to be shipped as production parts, with only those processing cores that are fully functional and meet all operating and performance specifications being activated for the use in the field. For example, a multicore processor that is specified as having 22 processing cores may, in fact, include 24 or more processing cores on the die. In this example, prior to shipping the processor as a production part, two of the processing cores may be disabled, and the resulting core configuration may be locked for the multiprocessor core. In some cases, one or both of the two disabled processing cores may be selected for disabling due to functional or characterization failures based on results of functional testing and characterization performed at manufacturing. In other cases, one or both of the two disabled processing cores may be fully functional, and might or might not meet all operating and performance specifications, and may be selected for disabling randomly, lexically (e.g., in order of their identifiers, beginning with core 0, core 1, etc.), or according to another heuristic, from among the processing cores that are fully functional and that might or might not meet all operating and performance specifications.

In some cases, after functional testing and characterization have been performed at manufacturing and a resulting core configuration has been established, prior to shipping, a multicore processor may include additional fully qualified or functional processing cores that are disabled. The multicore processor may, however, experience a failure out in the field. For example, in-field failures may include failures due to design marginalities, random defects other than those that result in infant mortality failures, aging and wearing out, or other physical failure modes in which defects can develop post-manufacturing test. In another example, the manufacturing testing and characterization for the multicore processor may not be mature enough to catch certain types of defects during sampling or early production. However, in existing multicore processors, no mechanism is provided for performing core failover in the field should any of the active cores of the multiprocessor core experience post-manufacturing failures. Instead, what little support for in-field failover currently exists is generally limited to enabling an entire spare component, such as an entire spare processor, spare controller, or spare chip.

In at least some embodiments of the present disclosure, a system or processor may include architectural and micro-architectural capabilities that provide fault tolerance options which can be invoked by end users on parts that are active in the field. For example, in some embodiments, any or all fully qualified cores and functional spares may be enabled, at manufacturing, for potential in-field activation. Any of these cores, if not already active, may be activated in the field to replace a core that was previously designated as an active core, but that for some reason needs to be disabled. In at least some embodiments, the mechanisms described herein for enabling and performing in-field core failover may allow a multicore processor that was configured and locked at manufacturing to be repaired in the field at a lower granularity than is possible in currently existing multicore processors. For example, these mechanisms may be used to recover from failures due to faulty components within the multicore processor die itself with no loss of capability and no additional cost in power or area.

In at least some embodiments, and in some situations, the mechanisms described herein may provide tolerance of and recover from faulty processing cores in multicore processors by customers, end users, and/or automated systems in which the processors operated. More specifically, these techniques may provide the capability for a customer, an end user, or an automated systems to disable a faulty core and enable a functional spare in a multicore processor that includes fewer active cores than the number of available, enabled cores. For example, some high frequency parts include redundant processing core capacity, but restrict the number of processing cores that are active at any given time in order to achieve consistently higher frequencies. In this example, there may be some number of disabled, but functional, cores available on the die. In the event of a failure of one of the active cores, one of the disabled, functional cores may be swapped for the failing active core using the in-field core failover mechanisms described herein. In various embodiments, an in-field core failover may be performed with or without a reset of the multicore processor or selected portions thereof.

Figure 2:
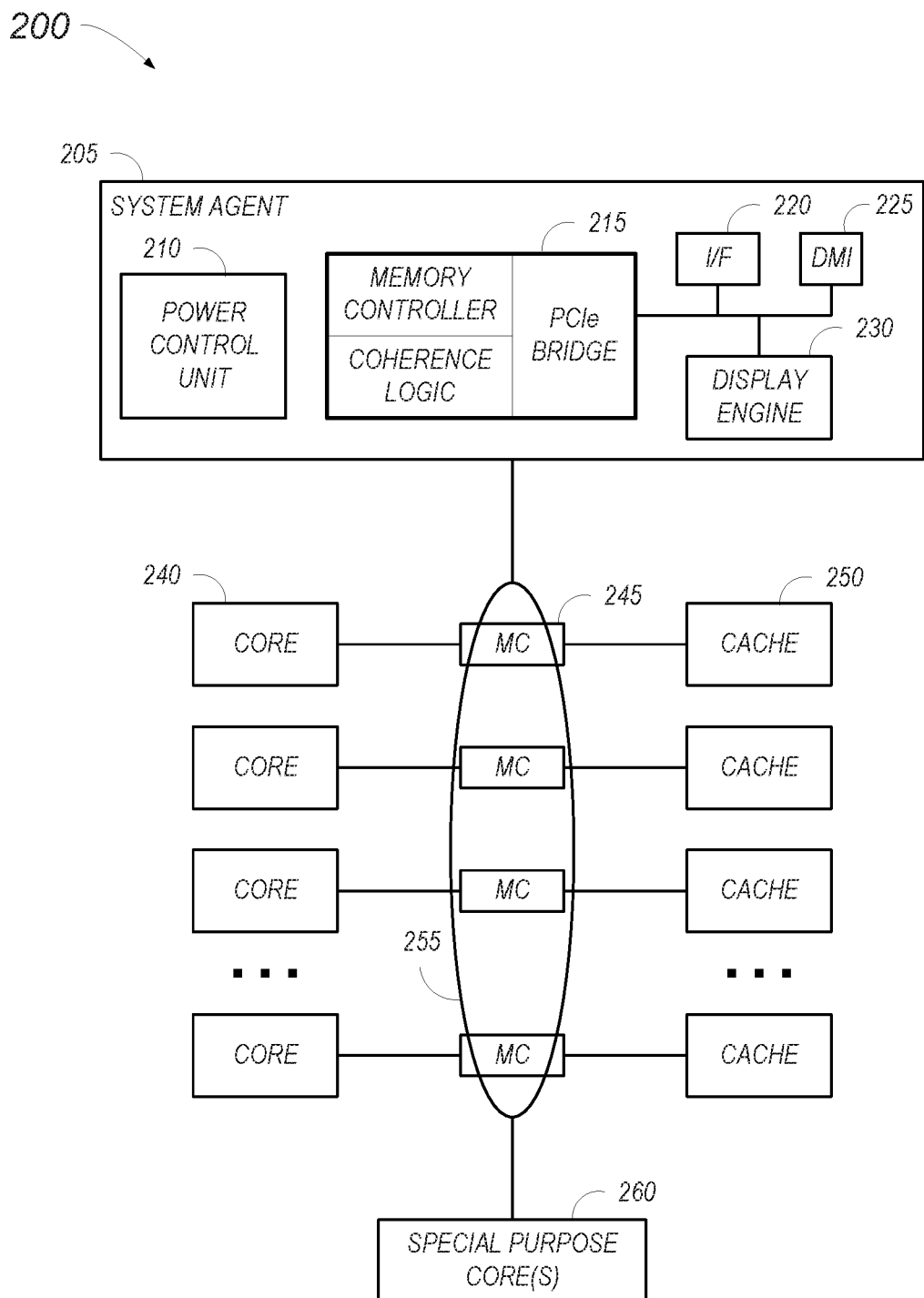
FIG. 2 is a block diagram illustrating selected elements of a multicore processor, in accordance with some embodiments of the present disclosure.

FIG. 2 is a block diagram illustrated selected elements of a multicore processor 200, in accordance with some embodiments of the present disclosure. Although processor 200 is shown and described as an example in FIG. 2, any suitable mechanism may be used. For example, some or all of the functionality of processor 200 described herein may be implemented by a digital signal processor (DSP), circuitry, instructions for reconfiguring circuitry, a microcontroller, an application specific integrated circuit (ASIC), or a microprocessor having more, fewer, or different elements than those illustrated in FIG. 2. Processor 200 may include any suitable mechanisms for enabling and performing in-field core failover. In at least some embodiments, such mechanisms may be implemented in hardware. For example, in some embodiments, some or all of the elements of processor 200 illustrated in FIG. 2 and/or described herein may be implemented fully or in part using hardware circuitry. In some embodiments, this circuitry may include static (fixed-function) logic devices that collectively implement some or all of the functionality of processor 200. In other embodiments, this circuitry may include programmable logic devices, such as field programmable logic gates or arrays thereof, that collectively implement some or all of the functionality of processor 200. In still other embodiments, this circuitry may include static, dynamic, and/or programmable memory devices that, when operating in conjunction with other hardware elements, implement some or all of the functionality of processor 200. For example, processor 200 may include a hardware memory having stored therein instructions which may be used to program processor 200 to perform one or more operations according to some embodiments of the present disclosure. Embodiments of processor 200 are not limited to any specific combination of hardware circuitry and software. Processor 200 may be implemented fully or in part by the elements described in FIGS. 1A-1C or in FIGS. 9-16.

In at least some embodiments, processor 200 may include a system agent 205 communicatively coupled to one or more processing cores 240. Furthermore, cores 240 and system agent 205 may be communicatively coupled to one or more caches 250. Cores 240, system agent 205, and caches 250 may be communicatively coupled via one or more memory control units 245. Furthermore, cores 240, system agent 205, and caches 250 may be communicatively coupled to one or more special purpose cores 260 via memory control units 245.

Processor 200 may include any suitable mechanism for interconnecting cores 240, system agent 205, and caches 250, and special purpose cores 260. In one embodiment, processor 200 may include a ring-based interconnect unit 255 to interconnect cores 240, system agent 205, and caches 250, and special purpose cores 260. In other embodiments, processor 200 may include any number of well-known techniques for interconnecting such units. Ring-based interconnect unit 255 may utilize memory control units 245 to facilitate interconnections.

Processor 200 may include a memory hierarchy comprising one or more levels of caches within the cores, one or more shared cache units such as caches 250, or external memory (not shown) coupled to the set of integrated memory controller units 245. Caches 250 may include any suitable cache. In one embodiment, caches 250 may include one or more mid-level caches, such as level 2 (L2), level 3 (L3), level 4 (L4), or other levels of cache, a last level cache (LLC), and/or combinations thereof.

In various embodiments, one or more of cores 240 may perform multi-threading. System agent 205 may include components for coordinating and operating cores 240. System agent unit 205 may include for example a power control unit (PCU) 210. The PCU 210 may be or include logic and components needed for regulating the power state of cores 240. System agent 205 may include a display engine 230 for driving one or more externally connected displays or special purpose cores 260. System agent 205 may include an interface 220 for communications busses for graphics. In one embodiment, interface 220 may be implemented by PCI Express (PCIe). In a further embodiment, interface 220 may be implemented by PCI Express Graphics (PEG). System agent 205 may include a direct media interface (DMI) 225. DMI 225 may provide links between different bridges on a motherboard or other portion of a computer system. System agent 205 may include a PCIe bridge 215 for providing PCIe links to other elements of a computing system. PCIe bridge 215 may be implemented using a memory controller and coherence logic.

Cores 240 may be implemented in any suitable manner. Cores 240 may be homogenous or heterogeneous in terms of architecture and/or instruction set. In one embodiment, some of cores 240 may be in-order while others may be out-of-order. In another embodiment, two or more of cores 240 may execute the same instruction set, while others may execute only a subset of that instruction set or a different instruction set.

Processor 200 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 200 may be provided from another company, such as ARM Holdings, Ltd, MIPS, etc. Processor 200 may be a special-purpose processor, such as, for example, a network or communication processor, compression engine, graphics processor, co-processor, embedded processor, or the like. Processor 200 may be implemented on one or more chips. Processor 200 may be a part of and/or may be implemented on one or more substrates using any of a number of process technologies, such as, for example, BiCMOS, CMOS, or NMOS.

In one embodiment, a given one of caches 250 may be shared by multiple ones of cores 240. In another embodiment, a given one of caches 250 may be dedicated to one of cores 240. The assignment of caches 250 to cores 240 may be handled by a cache controller or other suitable mechanism. A given one of caches 250 may be shared by two or more cores 240 by implementing time-slices of a given cache 250.

In some embodiments, a special purpose core 260 may implement an integrated graphics processing subsystem. For example, in one embodiment, special purpose core 260 may include a graphics processor. Furthermore, a special purpose core 260 may include a media engine that provides media encoding and video decoding. In other embodiments, special purpose cores 260 may include any suitable type and number of cores including special purpose circuitry or logic to implement additional functionality within processor 200.

In some embodiments, multiple ones of the cores 240 may be designated at active cores while one or more other cores 240 may be designated as functional spares. In some embodiments, the number of active cores may be equal to a predetermined maximum allowed number of active cores for processor 200. In some embodiments, the number of functional spares may be greater than or equal to a predetermined minimum number of functional spares for processor 200. In some embodiments, the designations of at least some of cores 240 may be modified during operation of processor 200 in an end-user environment, such a change being controlled, at least in part, by hardware circuitry or logic within power control unit 210. Various mechanisms for enabling and performing such a change are illustrated in the following figures and described in more detail below.

In at least some embodiments, customers, end users, and/or automated systems may, during operation in the field, be able to swap out a failing, or otherwise undesirable, active core for an inactive, but functional, core in multicore processors that include at least one inactive, but functional, spare core. In some cases, such spare cores may be fully functional cores that were included on the die to provide redundant capacity, but that were disabled in order to achieve a better thermal, power, and/or frequency profile for the processor as a whole than would be achievable if all fully functional cores of the multicore processor were active at the same time. Following such an in-field core failover, the total number of active cores may remain the same. For example, in some embodiments, the total number of active cores may be equal to a predetermined maximum number of active cores for the multicore processor at all times. In other embodiments, the total number of active cores may vary over time due to in-field core configuration changes, but it might never exceed a predetermined maximum number of active cores for the multicore processor. The existence of functional spares on the die, and the mechanisms included on the processor for enabling and performing in-field core failover, may provide the ability for a customer, an end user, or an automated system to leverage the functional spares in order to recover from single core failures resulting from infant mortality, aging or wearing out, or other failure modes that escape manufacturing testing and characterization screens.

In some embodiments, a user or automated system may, through a software interface to the processor, be able to specify which processing cores should be activated and, by elimination, which processing cores should be deactivated. Hardware circuitry and other logic within the processor may pick up this information during reset and may configure the active and disabled cores based on that information. In some embodiments, hardware circuitry and other logic within a power control unit of the processor may determine whether the cores specified as active cores meet certain minimum and maximum constraints and, if so, may activate those cores. If the cores specified as active cores do not meet applicable constraints, hardware circuitry and other logic within the power control unit may select a different set of cores to activate during the reset. In some embodiments, such selection may be based, at least in part, on characterization information stored on the processor for all of the fully functional cores or for all cores in the multicore processor.

Figure 3:
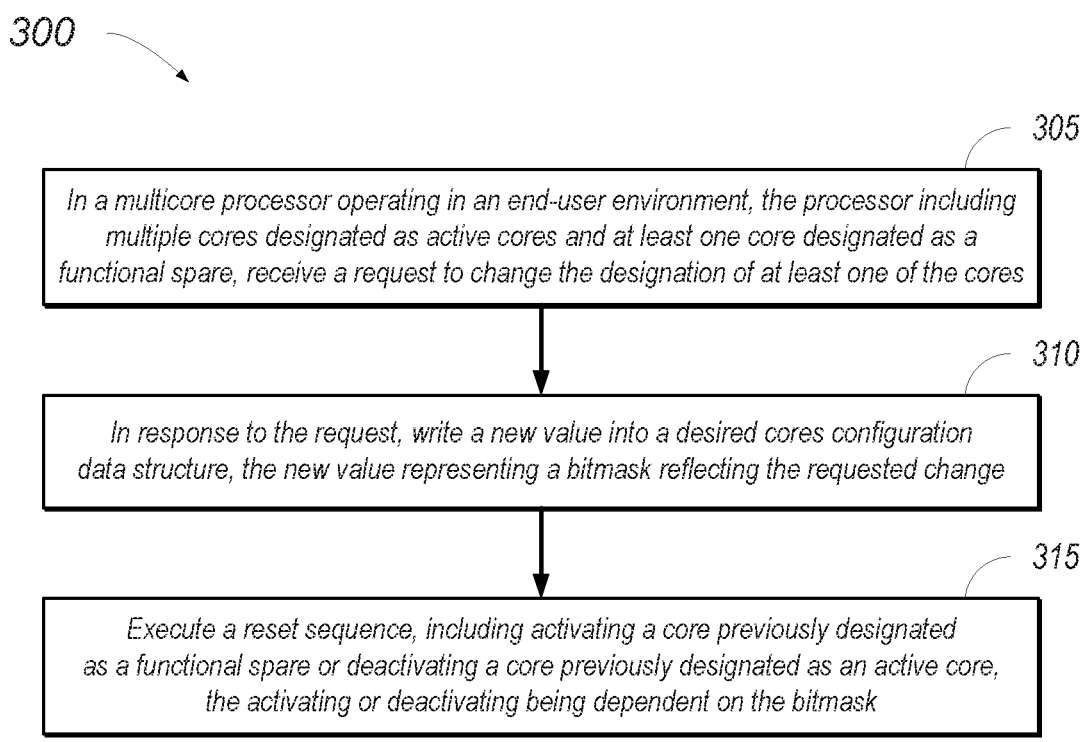
FIG. 3 is a flow diagram illustrating a method for in-field core failover, in accordance with some embodiments of the present disclosure.

FIG. 3 is a flow diagram illustrating a method 300 for in-field core failover, in accordance with some embodiments of the present disclosure. Method 300 may be implemented by any of the elements shown in FIGS. 1-2 or in FIGS. 9-16. Method 300 may be initiated by any suitable criteria and may initiate operation at any suitable point. In one embodiment, method 300 may initiate operation at 305. Method 300 may include greater or fewer operations than those illustrated. Moreover, method 300 may execute its operations in an order different than those illustrated in FIG. 3. Method 300 may terminate at any suitable operation. Moreover, method 300 may repeat operation at any suitable operation. Method 300 may perform any of its operations in parallel with other operations of method 300, or in parallel with operations of other methods. Furthermore, method 300 may be executed multiple times to perform multiple in-field core failovers or to otherwise reconfigure the set of active cores of a multicore processor. During the execution of method 300, other methods may be invoked, such as method 600, method 700, and/or method 800, described below. These additional methods may be invoked to perform at least some of the operations of method 300. In some embodiments, method 500, described below, may be performed prior to the execution of method 300 to prepare a multicore processor for in-field core failover.

At 305, in one embodiment, a request to change the designation of at least one core may be received in a multicore processor operating in an end-user environment. For example, the processor may include multiple cores designated as active cores and at least one core designated as a functional spare. The received request may include a request to change the designation of one or more cores from active to spare and/or a request to change the designation of one or more cores from spare to active.

At 310, in response to the request, a new value may be written into a desired cores configuration data structure. The new value may represent a bitmask reflecting the requested change. For example, in some embodiments, a new bitmask value may be written into a register in memory within a power control unit of the processor. In another embodiment, a new bitmask value may be written into a register in memory within another component of the processor. In yet another embodiment, a new bitmask value may be written into a field within a non-volatile memory that is external to the processor. Each bit in the bitmask may be associated with a respective core in the processor. The value of each bit may indicate whether the desired state of the respective core is the active state or a disabled state. At 315, a reset sequence may be executed, which may include activating a core that was previously designated as a functional spare or deactivating a core that was previously designated as an active core, where the activating or deactivating is dependent on the bitmask. In some embodiments, the reset may be a warm reset. A warm reset may include a reset that is performed without powering down the processor or a power control unit thereof. In some embodiments, the reset may be a cold reset. A cold reset may include a reset in which the processor, or at least some portions of the processor, are powered down.

Figure 4:
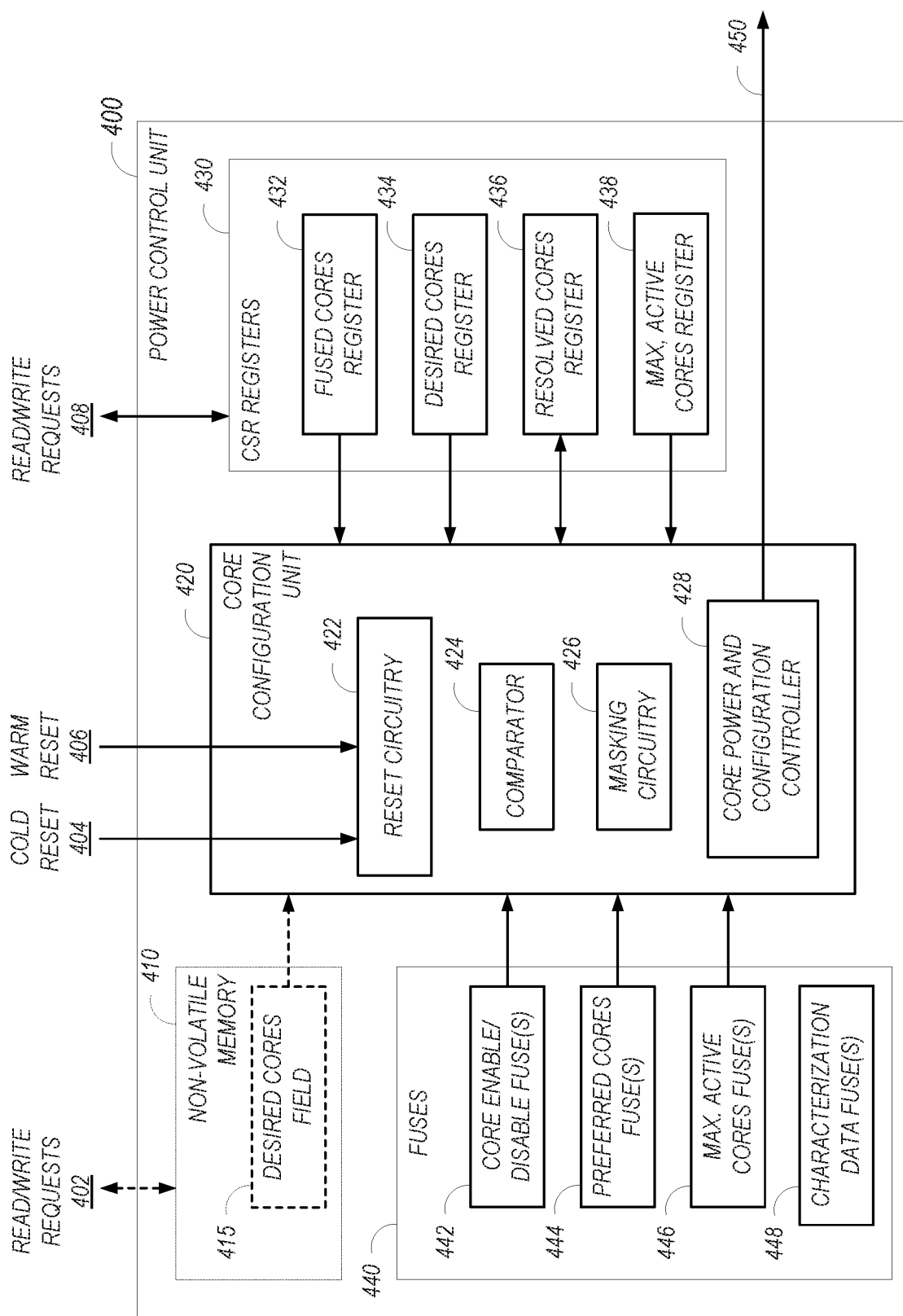
FIG. 4 is a block diagram illustrating selected elements of a power control unit of a multicore processor, in accordance with some embodiments of the present disclosure.

FIG. 4 is a block diagram illustrating selected elements of a power control unit 400 of a multicore processor, in accordance with some embodiments of the present disclosure. Although a power control unit 400 within a multicore processor is shown and described as an example in FIG. 4, any suitable mechanism may be used. For example, some or all of the functionality of power control unit 400 described herein may be implemented by a digital signal processor (DSP), circuitry, instructions for reconfiguring circuitry, a microcontroller, an application specific integrated circuit (ASIC), or a microprocessor having more, fewer, or different elements than those illustrated in FIG. 4. Power control unit 400 may include any suitable mechanisms for enabling and performing in-field core failover. In at least some embodiments, such mechanisms may be implemented in hardware. For example, in some embodiments, some or all of the elements of power control unit 400 illustrated in FIG. 4 and/or described herein may be implemented fully or in part using hardware circuitry. In some embodiments, this circuitry may include static (fixed-function) logic devices that collectively implement some or all of the functionality of power control unit 400. In other embodiments, this circuitry may include programmable logic devices, such as field programmable logic gates or arrays thereof, that collectively implement some or all of the functionality of power control unit 400. In still other embodiments, this circuitry may include static, dynamic, and/or programmable memory devices that, when operating in conjunction with other hardware elements, implement some or all of the functionality of power control unit 400. For example, power control unit 400 may include a hardware memory having stored therein instructions which may be used to program power control unit 400 to perform one or more operations according to some embodiments of the present disclosure. Embodiments of power control unit 400 are not limited to any specific combination of hardware circuitry and software. Power control unit 400 may be implemented fully or in part by the elements described in FIGS. 1A-2 or in FIGS. 9-16.

In at least some embodiments, power control unit 400 may be a component within a multicore processor, similar to power control unit 210 within system agent 205 of processor 200 illustrated in FIG. 2. In other embodiments, power control unit 400 may be a implemented outside the multicore processor, such as in a system agent or other component of a system-on-a-chip (SoC) that includes the multicore processor.

As illustrated in the example embodiment shown in FIG. 4, power control unit 400 may include multiple fuses 440 for permanently programming circuitry within the multicore processor to enable in-field core failover. Fuses 440 may include core enable/disable fuse(s) 442 to disable failed cores and to enable fully qualified cores and functional spares, preferred cores fuse(s) 444 to identify preferred cores, max. active cores fuse(s) 446 to specify the maximum allowed number of active cores for the particular multicore processor product or product version, and characterization data fuse(s) 448 to store core characterization data collected during manufacturing testing and characterization of the cores of the multicore processor. In some embodiments, if the value of max. active cores fuse(s) 446 is zero, this may indicate that in-field core failover is disabled in the multicore processor. In some embodiments, the preferred cores identified by preferred cores fuse(s) 444 may be determined during manufacturing testing and characterization of the cores based on the results of the manufacturing testing and characterization of the cores. For example, in some embodiments, the cores having the lowest power consumption may be selected as preferred cores. In another example, cores may be selected as preferred cores based on the physical topology of the multicore processor, in which the arrangement of various caches with respect to each of the cores and/or the distances between each of the cores and a corresponding memory controller may affect the overall performance of the multicore processor. In some embodiments, preferred cores fuse(s) 444 may include some fuses (bits) identifying the cores that should initially be designated as active cores and some fuses (bits) identifying one or more cores that should initially be designated as functional spares. In some embodiments, fuses 440 may be external to, and accessible by, the multicore processor and/or by power control unit 400.

In some embodiments, power control unit 400 may include multiple configuration space registers or device-specific control and status registers (CSR registers) 430. As illustrated in FIG. 4, CSR registers 430 may include a fused cores register 432 to store an indication of the enabled cores available for designation as active cores and functional spares, a desired cores register 434 to store a bitmask specifying a desired collection of active cores, a resolved cores register 436 to store an indication of the currently active cores, and a max. active cores register 438 to store a value representing the maximum allowed number of active cores for the particular multicore processor product or product version. In some embodiments, a value representing the maximum allowed number of active cores may be stored in a field of another one of the CSR registers 430, rather than in a dedicated max. active cores register. In some embodiments, the maximum allowed number of active cores for the particular multicore processor product or product version may be exposed using a BIOS mailbox (e.g., through a BIOS-to-firmware interface) or a mailbox stored in other non-volatile storage.

In some embodiments, the enabled cores identified in fused cores register 432 may include only fully qualified cores that are suitable for designation as either active cores or functional spares. In other embodiments, the enabled cores identified in fused cores register 432 may include both fully qualified cores and cores that are fully functional but that do not meet all applicable operating and performance specifications. In some embodiments, desired cores register 434 may include a single-bit lock field that, once set to a value of "1" locks the contents of this register, including the value stored in a bitmask field of the register, until this bit is cleared by a reset. In some embodiments, the bitmask field may be implemented as a "cores off" mask. In such embodiments, if a given bit in this field is set to a value of "1", this indicates that, in the desired core configuration, a core associated with the given bit should not be activated following the next reset. In some embodiments, all of the registers within CSR registers 430 are readable, but only desired cores register 434 is writable. For example, fused cores may be populated by the pcode based on the contents of core enable/disable fuse(s) 442, but may otherwise be a read only register. Desired cores register 434 may be writable by the BIOS or by other privileged software, in different embodiments. Resolved cores register 436 may reflect the results of applying the bitmask specified in desired cores register 434 to the contents of fused core(s) register 432, and may include one bit per core whose value indicates whether or not the core is active.

In some embodiments, power control unit 400 may include a core configuration unit 420, which may include reset circuitry 422, at least one comparator 424, masking circuitry 426, and a core power and configuration controller 428. In some embodiments, a comparator 424 may be used to compare the number of active cores specified by the bitmask stored in desired cores register 434 to a predefined maximum allowable number of cores. In some embodiments, masking circuitry 426 may be used to derive the contents of resolved cores register 436 by applying the bitmask stored in desired cores register 434 to the contents of fused cores register 432. In some embodiments, core power and configuration controller 428 may be implemented as a dedicated microcontroller that executes microcode stored in a memory within core power and configuration controller 428. This microcode may sometimes be referred to as "pcode". In such embodiments, the operations of comparator 424 and/or masking circuitry 426 may be performed by the pcode executing on core power and configuration controller 428. In some embodiments, power control unit 400 may include a non-volatile memory 410, which may include a desired cores field 415. In other embodiments, non-volatile memory 410 may be external to the multicore processor or to power control unit 400. In various embodiments, any of the components illustrated in FIG. 4 as being implemented within power control unit 400 may instead be implemented outside of a power control unit within a multicore processor or system, or these components may be partitioned differently between power control unit 400 and other portions of multicore processor or system.

In some embodiments, power control unit 400 may receive, among other inputs, read/write requests 402, which are directed to desired cores field 415 within non-volatile memory 410, read/write requests 408, which are directed to various registers within CSR registers 430, a cold reset signal or indicator 404, and/or a warm reset signal or indicator 406. In some embodiments, following a determination of an initial core configuration for the multicore processor and/or following a determination of an updated core configuration for the multicore processor (e.g., as a result of performance of an in-field core failover), power control unit 400 or, more specifically, core power and configuration controller 428, may output signals 450 to enable and/or disable various cores in accordance with the updated core configuration. For example, in some embodiments, signals 450 may include a respective enable/disable signal for each of the cores in the multicore processor controlling whether that core is activated (e.g., powered up) or disabled (e.g., powered down). In other embodiments, one or more output signals 450 may be encoded to provide data usable by another component of the multicore processor to and/or disable various cores in accordance with the updated core configuration. In some embodiments, output signals 450 may be generated by pcode executing on core power and configuration controller 428.

While in the example embodiment illustrated in FIG. 4, power control unit 400 includes multiple fuses for permanently programming circuitry within the multicore processor to enable in-field core failover, in other embodiments, mechanisms other than fuses may be used to permanently program circuitry within the multicore processor to disable failed cores, to enable fully qualified cores and functional spares, to identify preferred cores, to specify the maximum number of active cores, and/or to store core characterization data collected during manufacturing testing and characterization of the cores of the multicore processor.

Figure 5:
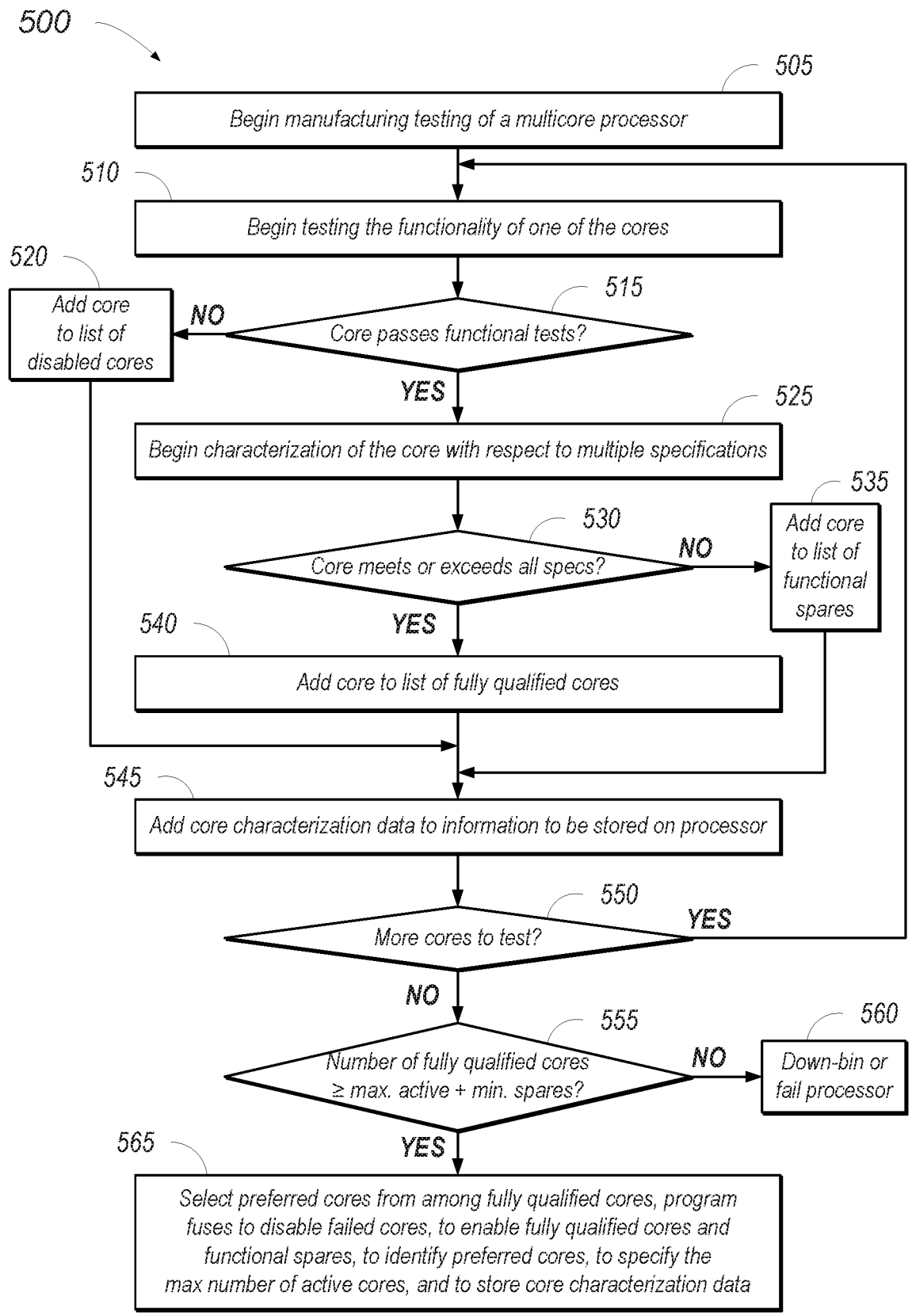
FIG. 5 is a flow diagram illustrating a method for preparing a multicore processor for in-field core failover during manufacturing test, according to some embodiments of the present disclosure.

FIG. 5 is a flow diagram illustrating a method 500 for preparing a multicore processor for in-field core failover during manufacturing test, according to some embodiments of the present disclosure. Method 500 may be implemented by any of the elements shown in FIGS. 1-2 or in FIGS. 9-16. Method 500 may be initiated by any suitable criteria and may initiate operation at any suitable point. In one embodiment, method 500 may initiate operation at 505. Method 500 may include greater or fewer operations than those illustrated. Moreover, method 500 may execute its operations in an order different than those illustrated in FIG. 5. Method 500 may terminate at any suitable operation. Moreover, method 500 may repeat operation at any suitable operation. Method 500 may perform any of its operations in parallel with other operations of method 500, or in parallel with operations of other methods. Furthermore, method 500 may be executed multiple times to prepare different multicore processors, and multiple instances thereof, for in-field core failover during manufacturing test. In some embodiments, method 500 may be invoked prior the execution of method 300, described above.

At 505, in one embodiment, manufacturing testing of a multicore processor may begin. More specifically, at 510, testing of the functionality of one of the cores of the multicore processor may begin. If, at 515, the core passes all functional tests, method 500 may continue at 525. Otherwise, method 500 may proceed to 520. At 520, the core may be added to a list of disabled cores, after which method 500 may continue at 545. At 525, characterization of the core with respect to multiple specifications may begin. For example, the core may be characterized with respect to thermal characteristics, power consumption characteristics, frequency characteristics (e.g., speed), a voltage-to-frequency curve, and/or other performance-related characteristics. In general, the characterization may be performed with respect to any suitable metrics of merit for the multicore processor.

If at 530, the core meets or exceeds all of the specifications for which the characterization is performed, method 500 may continue at 540. Otherwise, method 500 may proceed to 535. At 535, the core may be added to a list of functional spares, after which method 500 may continue at 545. For example, if the core is fully functional but does not meet all of the specifications for which the characterization is performed, it may still be suitable for use as a functional spare to be swapped into service as an active core in some in-field applications. At 540, the core may be added to a list of fully qualified cores. This list may include only those cores that pass the functional tests and also meet or exceed all of the specifications for which the characterization is performed.

At 545, the characterization data for the core may be added to information that is to be stored on the processor as part of the manufacturing testing. In some embodiments, the characterization data may include the results of the functional testing of the core, regardless of whether or not the core passed all of the functional tests. In some embodiments, the characterization data may include the results of the characterization of the core with respect to multiple specifications only if the core passed all of the functional tests. In other embodiments, the characterization data may include at least some results of the characterization of the core with respect to multiple specifications, assuming it was possible to assess the core with respect to any of the specifications, even if the core did not pass all of the functional tests.

At 550, while there are additional cores to test, method 500 may return to 510, and may repeat some or all of the operations shown as 510-545, as appropriate, for each additional core. If, or once, there are no additional cores to test, method 500 may continue at 555. In the example embodiment illustrated in FIG. 5, if, at 555, the number of fully qualified cores is less than the maximum allowed number of active cores plus the minimum number of functional spares, the processor may be failed or may be sorted into a bin for processors meeting different configuration specifications, as in 560. In the example embodiment illustrated in FIG. 5, if, at 555, the number of fully qualified cores is greater than or equal to the maximum allowed number of active cores plus the minimum number of functional spares, the method may continue at 565. In other embodiments, if, at 555, the number of fully qualified cores is greater than or equal to the maximum allowed number of active cores, and if the number of fully qualified cores plus the number of functional spares is greater than or equal to the maximum allowed number of active cores plus the minimum number of functional spares, method 500 may continue at 565.

In the example embodiment illustrated in FIG. 5, at 565, a collection of preferred cores may be selected from among the fully qualified cores. The number of preferred cores may be equal to the maximum allowed number of active cores. In some embodiments, if the number of fully qualified cores is greater than the maximum allowed number of active cores, any remaining fully qualified cores may be considered to be additional functional spares. Any remaining fully qualified cores and/or any functional spares that are not fully qualified may initially be disabled. In the example embodiment illustrated in FIG. 5, at 565, various fuses within the multicore processor may be programmed to disable failed cores, to enable fully qualified cores and functional spares, to identify preferred cores, to specify the maximum number of active cores, and/or to store core characterization data collected during manufacturing testing and characterization of the cores of the multicore processor. In other embodiments, mechanisms other than fuses may be used to permanently program circuitry within the multicore processor to disable failed cores, to enable fully qualified cores and functional spares, to identify preferred cores, to specify the maximum number of active cores, and/or to store core characterization data collected during manufacturing testing and characterization of the cores of the multicore processor.

Note that while method 500 is illustrated in FIG. 5 as performing manufacturing testing and characterization for one core at a time, in some embodiments, such testing and characterization operations may be applied to multiple cores of a single multicore processor or to the cores of multiple processors in parallel using any suitable test equipment, including automated test equipment in a manufacturing facility that produces the multicore processor.

In some embodiments, following manufacturing testing and characterization of the cores of a multicore processor and the selection and activation of a set of cores to be exposed to the customer, end user, or automated system in which the processor is to operate, the multicore processor may be marked and/or sold as a particular product or product version for which the number of fully qualified active cores and the minimum number of functional spares are specified and/or advertised. In some cases, if early samples of a multicore processor are to be provided to a customer, a requirement that all of the active cores be fully qualified or a requirement to include a minimum number of functional spares may be relaxed. Under these circumstances, the customer may accept processor samples that do not meet the specified or advertised characteristics for the products or product versions that they expect to receive as production parts. The customer may, however, have access to the core characterization data stored on each of the multicore processors, and may modify their initial evaluations of the processor samples, or the development of applications to be executed on the processors, based on any limitations of the processor samples that are identified in the core characterization data. This may include, for example, relying only on the active cores in a given sample processor if the core characterization data indicates that there are no functional spares on the given sample part to be swapped with one of the active cores.

Figure 6:
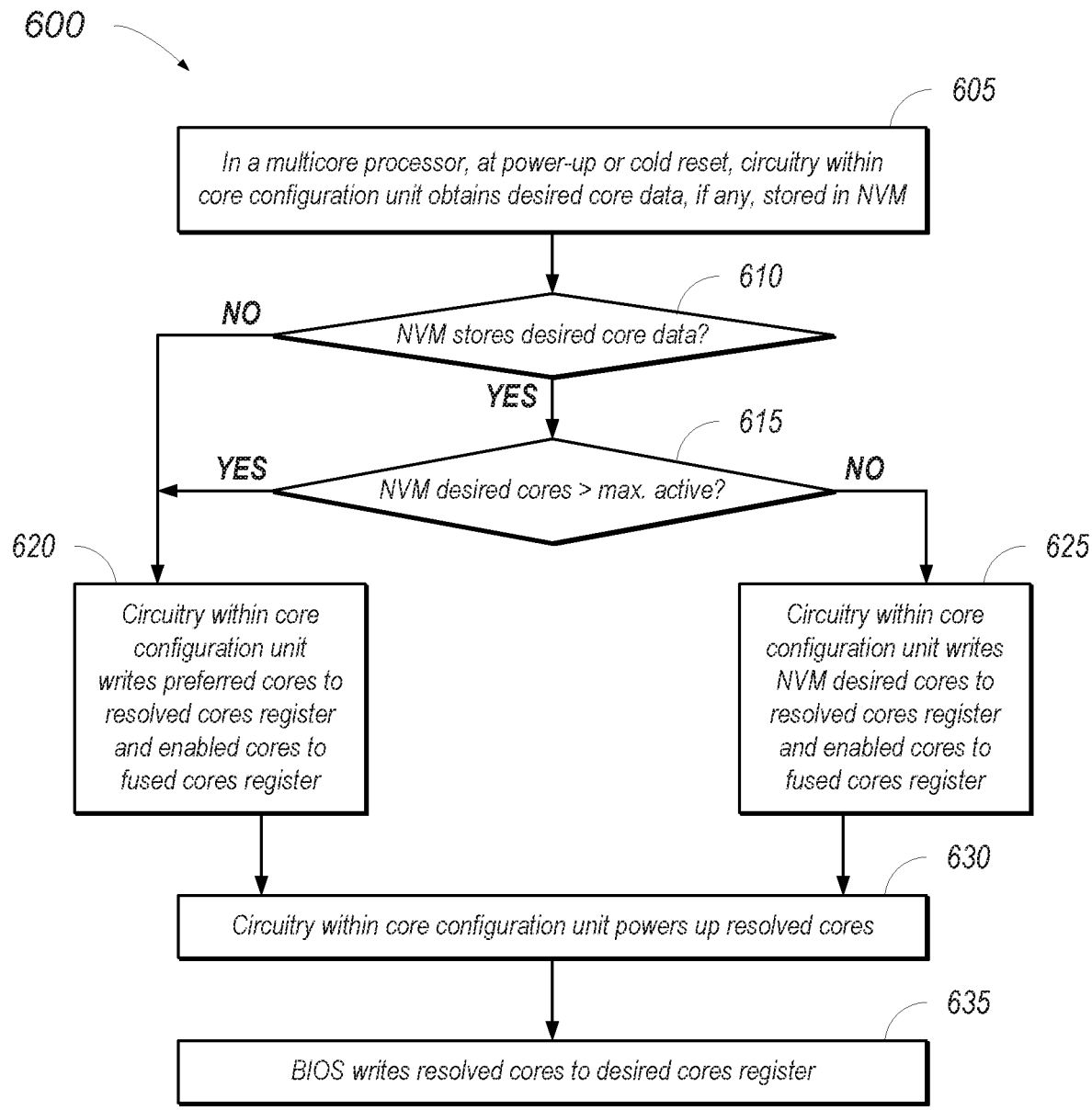
FIG. 6 is a flow diagram illustrating a method for initializing the configuration of cores within a multicore processor, according to some embodiments of the present disclosure.

FIG. 6 is a flow diagram illustrating a method 600 for initializing the configuration of cores within a multicore processor, according to some embodiments of the present disclosure. Method 600 may be implemented by any of the elements shown in FIGS. 1-2 or in FIGS. 9-16. Method 600 may be initiated by any suitable criteria and may initiate operation at any suitable point. In one embodiment, method 600 may initiate operation at 605. Method 600 may include greater or fewer operations than those illustrated. Moreover, method 600 may execute its operations in an order different than those illustrated in FIG. 6. Method 600 may terminate at any suitable operation. Moreover, method 600 may repeat operation at any suitable operation. Method 600 may perform any of its operations in parallel with other operations of method 600, or in parallel with operations of other methods. Furthermore, method 600 may be executed multiple times to re-initializing the configuration of cores within a multicore processor following a power-up or other cold reset. Method 600 may be invoked during the execution of method 300, described above. For example, method 600 may be invoked to perform at least some of the operations of method 300.

At 605, in one embodiment, upon a power-up or a cold reset of a multicore processor, circuitry within a core configuration unit (e.g., reset circuitry or circuitry within a core power and configuration controller) may obtain data identifying desired cores, if any, that is stored in a desired cores field of a non-volatile memory. For example, data identifying desired cores may be stored in a desired cores field of a non-volatile memory that is external to, but accessible by, the multicore processor. At 610, if a non-volatile memory stores desired core data, method 600 may continue at 615. Otherwise, method 600 may proceed to 620. If, at 615, the number of desired cores identified in the desired cores field of the non-volatile memory exceeds the maximum allowed number of active cores, method 600 may proceed to 620. Otherwise, method 600 may proceed to 625. At 620, circuitry within the core configuration unit (e.g., reset circuitry or circuitry within a core power and configuration controller) may write data identifying a set of preferred cores to a resolved cores register and may write data identifying the enabled cores to a fused cores register. In some embodiments, the writing may include a basic operating system or firmware executing on the processor (e.g., a BIOS or pcode executing on a core power and configuration controller) writing the data identifying a set of preferred cores to the resolved cores register and writing the data identifying the enabled cores to the fused cores register. Other software interfaces for writing to the resolved cores register and to the fused cores register may be implemented in other embodiments.

In various embodiments, the circuitry within the core configuration unit (e.g., reset circuitry or circuitry within a core power and configuration controller) may identify the set of preferred cores using any suitable mechanisms or criteria. In one embodiment, if the number of desired cores identified in the desired cores field of the non-volatile memory exceeds the maximum allowed number of active cores, the circuitry may revert to the set of cores that was identified at manufacturing as being preferred cores, as indicated by preferred cores fuse(s) 444. In another embodiment, if the number of desired cores identified in the desired cores field of the non-volatile memory exceeds the maximum allowed number of active cores, the circuitry may identify as the preferred cores the first N cores that are enabled for designation as active cores or functional spares, as indicated by core enable/disable fuse(s) 442, where N is the maximum allowed number of active cores. In still other embodiments, if the number of desired cores identified in the desired cores field of the non-volatile memory exceeds the maximum allowed number of active cores, the circuitry within the core configuration unit may select cores to be identified as the preferred cores based on characterization data for the cores that are enabled for designation as active cores or functional spares. For example, the circuitry within the core configuration unit may select the cores to be identified as the preferred cores from among the enabled cores that meet particular thermal characteristics, power consumption characteristics, frequency characteristics (e.g., speed), voltage-to-frequency curve characteristics, and/or other performance-related characteristics that are suitable for the end-user environment in which the processor is operating or in which the processor is intended to operate, or that are suitable for a particular application that is currently executing, or that is to be executed, on the processor. In some such embodiments, the characterization data may be stored in characterization data fuse(s) 448 and the enabled cores may be indicated by core enable/disable fuse(s) 442.

At 625, circuitry within the core configuration unit (e.g., reset circuitry or circuitry within a core power and configuration controller) may write data representing the desired cores data that was stored in a desired cores field of a non-volatile memory to the resolved cores register and may write data identifying the enabled cores to the fused cores register. In some embodiments, this may include a basic operating system or firmware executing on the processor (e.g., a BIOS or pcode executing on a core power and configuration controller) writing the data representing the desired cores data that was stored in a desired cores field of a non-volatile memory to the resolved cores register to the resolved cores register and writing the data identifying the enabled cores to the fused cores register. At 630, in some embodiments, reset circuitry within the core configuration unit may power up the cores that are identified by the data in the resolved cores register. At 635, the BIOS may write data representing the resolved cores to a desired cores register.

In at least some embodiments, in order to change a core configuration of a multicore processor, a new bitmask value may be written to a desired cores data structure in a non-volatile memory or in a set of configuration space registers or device-specific control and status registers (CSR registers), after which a warm reset may be triggered to read and apply the new bitmask value. In some embodiments, a basic operating system or firmware executing on the processor (e.g., a BIOS or pcode executing on a core power and configuration controller) may configure the desired cores register on behalf of an end-user application. In some embodiments, the desired cores register may be a PCI Configuration Space accessible register that can be accessed by any ring zero software. In such embodiments, the operating system may configure the desired cores register on behalf of an end-user application. For example, a user-level driver may allow an end-user application to specify the desired cores and/or may allow an end-user application to signal the operating system to ask for a warm reset. In some embodiments, the operating system software may detect the invocation of the user-level driver and may trigger a warm reset of the processor in response. In other embodiments, the operating system software may receive a signal from the application software requesting a warm reset of the processor, and may trigger a warm reset in response.

Figure 7:
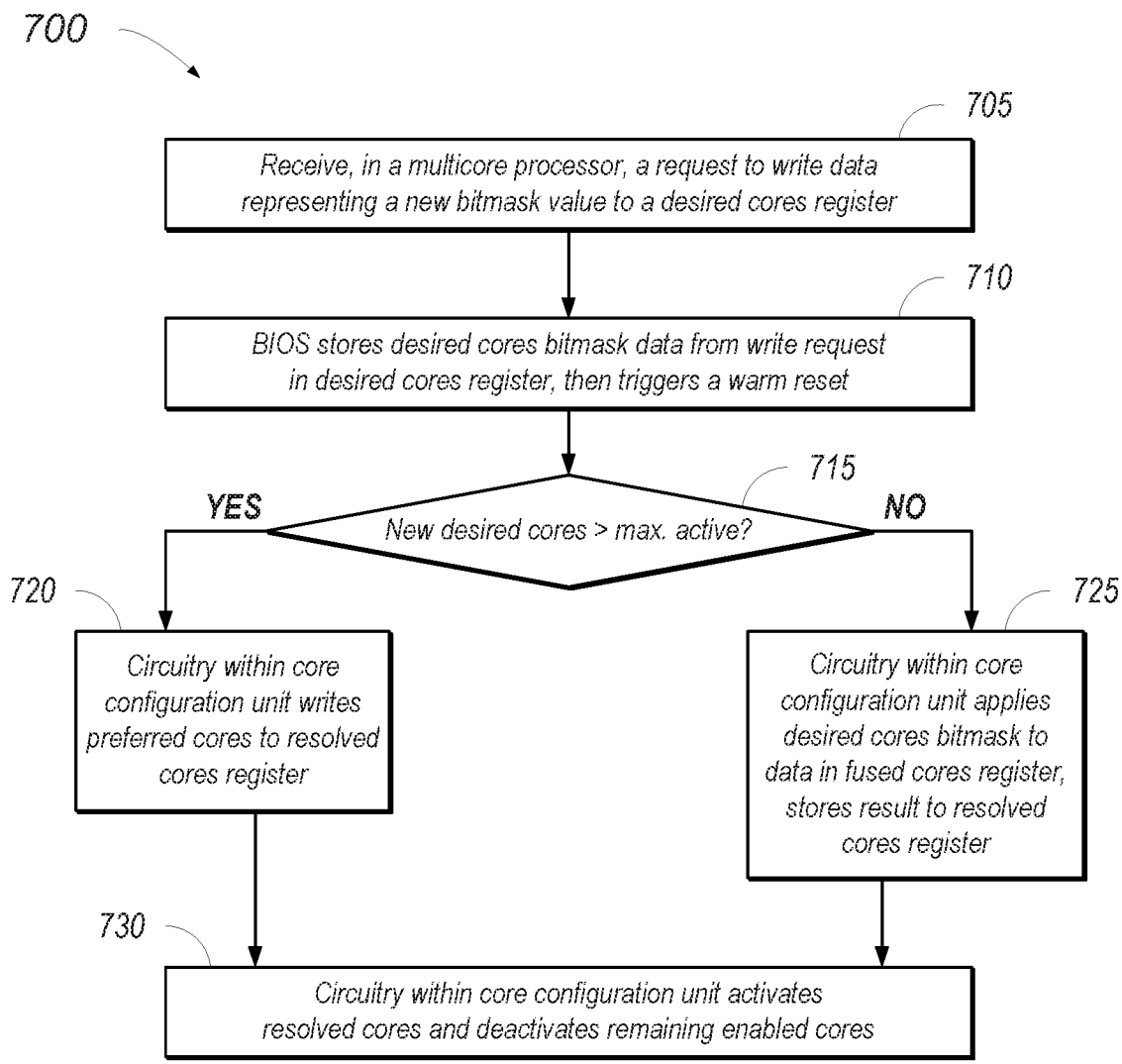
FIG. 7 is a flow diagram illustrating a method for changing the core configuration of a multiprocessor core in the field, according to some embodiments of the present disclosure.

FIG. 7 is a flow diagram illustrating a method 700 for changing the core configuration of a multiprocessor core in the field, according to some embodiments of the present disclosure. Method 700 may be implemented by any of the elements shown in FIGS. 1-2 or in FIGS. 9-16. Method 700 may be initiated by any suitable criteria and may initiate operation at any suitable point. In one embodiment, method 700 may initiate operation at 705. Method 700 may include greater or fewer operations than those illustrated. Moreover, method 700 may execute its operations in an order different than those illustrated in FIG. 7. Method 700 may terminate at any suitable operation. Moreover, method 700 may repeat operation at any suitable operation. Method 700 may perform any of its operations in parallel with other operations of method 700, or in parallel with operations of other methods. Furthermore, method 700 may be executed multiple times to change the core configuration of a multiprocessor core in the field in response to various requests to do so. Method 700 may be invoked during the execution of method 300, described above. For example, method 700 may be invoked to perform at least some of the operations of method 300.

At 705, in one embodiment, a request to write data representing a new bitmask value to a desired cores register may be received in a multicore processor. At 710, in response to the request, the BIOS may store desired cores bitmask data obtained from the write request in a desired cores register, after which it may trigger a warm reset of the multicore processor.

During execution of the warm reset sequence, if, at 715, the number of desired cores identified in the new bitmask value is greater than the maximum allowed number of active cores, method 700 may proceed to 720. Otherwise, method 700 may proceed to 725. At 720, circuitry within a core configuration unit of the multicore processor (e.g., reset circuitry or circuitry within a core power and configuration controller) may write data identifying a set of preferred cores to a resolved cores register. In some embodiments, the writing may include a basic operating system or firmware executing on the processor (e.g., a BIOS or pcode executing on a core power and configuration controller) writing the data identifying a set of preferred cores to the resolved cores register. Other software interfaces for writing to the resolved cores register may be implemented in other embodiments.

In various embodiments, the circuitry within the core configuration unit (e.g., reset circuitry or circuitry within a core power and configuration controller) may identify the set of preferred cores using any suitable mechanisms or criteria. In one embodiment, if the number of desired cores identified in the new bitmask value is greater than the maximum allowed number of active cores, rather than updating the resolved cores register to reflect a desired configuration that is not allowed, the circuitry within the core configuration unit may instead cause the configuration to revert to a preferred set of cores that was identified during manufacturing testing and characterization, as indicated by preferred cores fuse(s) 444. In another embodiment, if the number of desired cores identified in the new bitmask value is greater than the maximum allowed number of active cores, the circuitry within the core configuration unit may identify as the preferred cores the first N cores (in order of their identifiers) that are enabled for designation as active cores or functional spares, as indicated by core enable/disable fuse(s) 442, where N is the maximum allowed number of active cores. In still other embodiments, if the number of desired cores identified in the new bitmask value is greater than the maximum allowed number of active cores, the circuitry within the core configuration unit may select cores to be identified as the preferred cores based on characterization data for the cores that are enabled for designation as active cores or functional spares. For example, the circuitry within the core configuration unit may select the cores to be identified as the preferred cores from among the enabled cores that meet particular thermal characteristics, power consumption characteristics, frequency characteristics (e.g., speed), voltage-to-frequency curve characteristics, and/or other performance-related characteristics that are suitable for the end-user environment in which the processor is operating or in which the processor is intended to operate, or that are suitable for a particular application that is currently executing, or that is to be executed, on the processor. In some such embodiments, the characterization data may be stored in characterization data fuse(s) 448 and the enabled cores may be indicated by core enable/disable fuse(s) 442.

At 725, circuitry within the core configuration unit (e.g., reset circuitry or circuitry within a core power and configuration controller) may apply the desired cores bitmask obtained from the write request to data in a fused cores register, and may store data representing the result to the resolved cores register. In some embodiments, the storing may include a basic operating system or firmware executing on the processor (e.g., a BIOS or pcode executing on a core power and configuration controller) writing the result of the masking operation to the resolved cores register. At 730, in some embodiments, reset circuitry within the core configuration unit may activate (power up) the resolved cores and deactivate (power down or refrain from powering up) any remaining enabled cores.

In various embodiments of the present disclosure, the mechanisms described herein for enabling and performing in-field core failover may allow a customer, an end user, or an automated system in which a multicore processor is operating to initiate a failover to a functional spare in response to determining that an active core on the processor has failed or is otherwise unsuitable for operation within a current or target end-user environment, or for executing a particular end-user application. For example, a customer, an end user, or an automated system may perform customer-specific, system-specific, and/or application-specific testing and/or characterizations, through which active cores that are unsuitable for operation within a current or target end-user environment, or for executing a particular end-user application, may be identified. In some embodiments, the mechanisms described herein for enabling and performing in-field core failover may also allow a customer, an end user, or an automated system in which a multicore processor is operating to swap out active cores and replace them with functional spares even if the active cores are fully functional and meet all minimum specifications. For example, the customer, end user, or automated system may perform multiple such swaps, one at a time, in order to identify a combination of active cores that best meets particular thermal characteristics, power consumption characteristics, frequency characteristics (e.g., speed), voltage-to-frequency curve characteristics, and/or other performance-related characteristics of the multicore processor or system as a whole. In some embodiments, such an approach may be supported by an application-level interface through which different bitmask values for the desired cores register may be specified or by a setup screen in the BIOS that the user can edit to try different core configuration settings. In any case, a predetermined maximum allowed number of active cores may be enforced by circuitry or logic within a power control unit of the multicore processor or system. For example, in some embodiments, the pcode executing in a core power and configuration controller (such as controller 428 illustrated in FIG. 4) may ensure that the total number of active cores is restricted to the maximum allowed number of active cores for the particular multicore processor product or product version.

Figure 8:
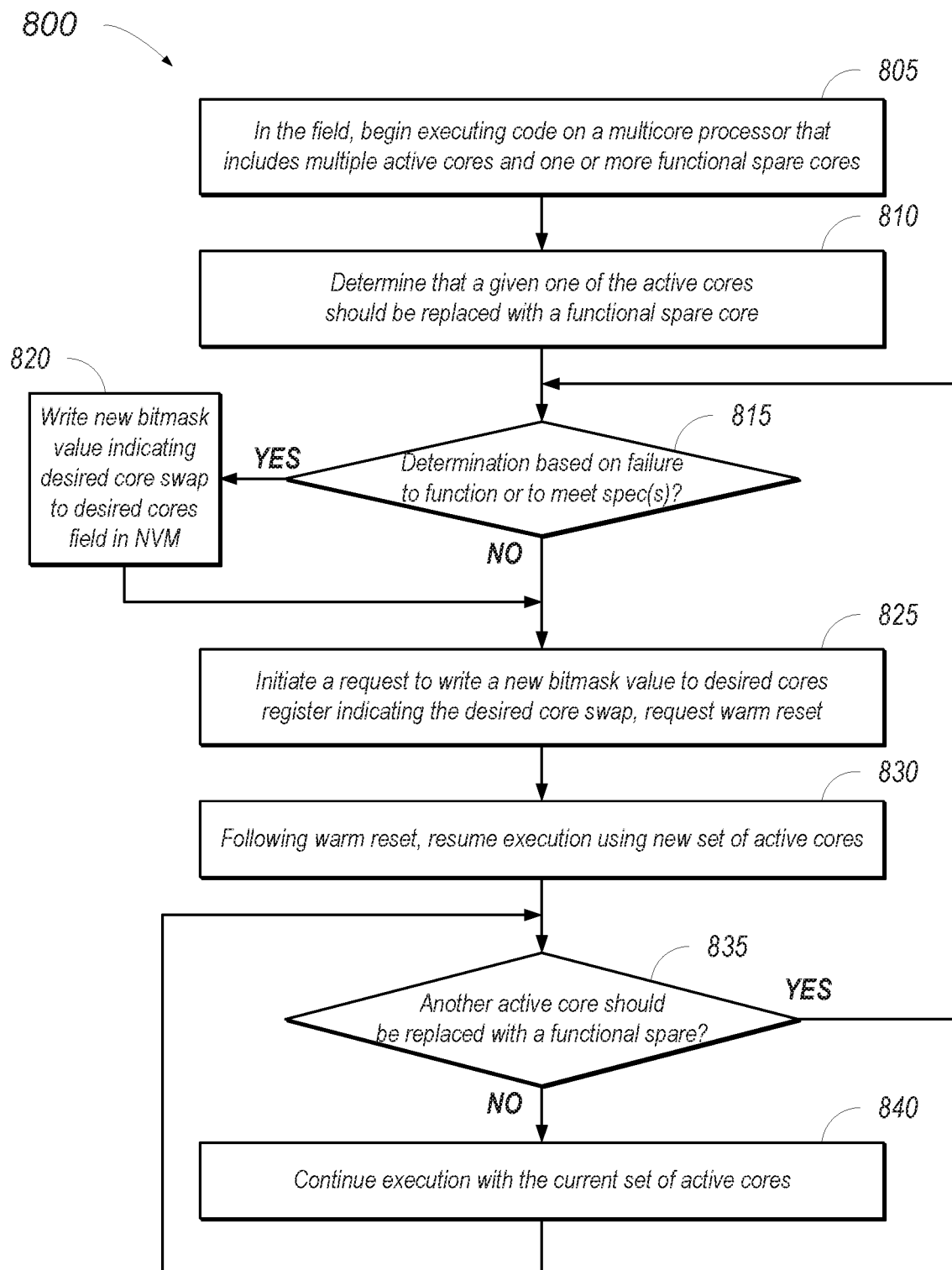
FIG. 8 is a flow diagram illustrating a method for initiating a change in the core configuration of a multicore processor in the field, according to some embodiments of the present disclosure.

FIG. 8 is a flow diagram illustrating a method 800 for initiating a change in the core configuration of a multicore processor in the field, according to some embodiments of the present disclosure. Method 800 may be implemented by any of the elements shown in FIGS. 1-2 or in FIGS. 9-16. Method 800 may be initiated by any suitable criteria and may initiate operation at any suitable point. In one embodiment, method 800 may initiate operation at 805. Method 800 may include greater or fewer operations than those illustrated. Moreover, method 800 may execute its operations in an order different than those illustrated in FIG. 8. Method 800 may terminate at any suitable operation. Moreover, method 800 may repeat operation at any suitable operation. Method 800 may perform any of its operations in parallel with other operations of method 800, or in parallel with operations of other methods. Furthermore, method 800 may be executed multiple times to initiate changes in the core configuration of a multicore processor in the field due to a failure or for any other reason. Method 800 may be invoked during the execution of method 300, described above. For example, method 800 may be invoked to perform at least some of the operations of method 300.

At 805, in one embodiment, a customer, an end user, or an automated system in which the multicore processor is operating may begin executing code on a multicore processor in the field that includes multiple active cores and one or more functional spare cores. In some embodiments, the executing code may represent or include test code, characterization code, or application code specific to the customer, end user, or automated system in which the multicore processor is operating.

At 810, it may be determined that a given one of the active cores of the multicore processor should be replaced with a functional spare core. This determination may be made for any of a variety of reasons. In one example, the customer, end user, or automated system may determine that the given active core has failed or is otherwise unsuitable for operation within a current or target end-user environment, or for executing a particular end-user application, In another example, the customer, end user, or automated system may perform such a swap as part of an exercise to identify a combination of active cores that best meets particular thermal characteristics, power consumption characteristics, frequency characteristics (e.g., speed), voltage-to-frequency curve characteristics, and/or other performance-related characteristics of the multicore processor or system as a whole. If, as shown at 815, the determination to replace an active core with a functional spare core is based on failure of the active core to function properly when executing the code in the environment in which it is operating or is based on a failure of the active core to meet all required specifications when executing the code in the environment in which it is operating, method 800 may continue at 820. Otherwise, method 800 may proceed directly to 825. Note that a functional spare core with which an active core is to be replaced may be a fully qualified core or may be a fully functional core that is not fully qualified with respect to its characterization.

At 820, the customer, end user, or automated system may write a new bitmask value indicating a desired core swap to a desired cores field in a non-volatile memory, after which method 800 may continue at 825. For example, if the customer, end user or automated system has identified a non-functional core, writing a new bitmask value to a desired cores field in a non-volatile memory may prevent that core from being selected as a preferred core or as an active during a subsequent power-up or a cold reset of the multicore processor. At 825, the customer, end user, or automated system may initiate a request to write a new bitmask value to a desired cores register indicating the desired core swap, and may request that a warm reset be performed following the write to the desired cores register. For example, a software interface may expose the desired cores register to read/write requests by application software or by a basic operating system or firmware executing on the multicore processor (e.g., the BIOS or pcode executing on a core power and configuration controller). A software interface may also allow application software to request that the BIOS trigger a warm reset following the write of the new bitmask value to the desired cores register. In some embodiments, the desired cores register may be exposed using a BIOS mailbox (e.g., through a BIOS-to-firmware interface) or a mailbox stored in other non-volatile storage.

At 830, following a warm reset, execution may resume using a new set of active cores. For example, execution of an application that was executing prior to the warm reset may continue following the warm reset, and/or execution of one or more other applications may begin following the warm reset. At 835, if another active core should be replaced with a functional spare, method 800 may return to 815, after which it may repeat some or all of operations 815-830, as appropriate, to replace an active core with a functional spare or to perform a different core configuration change. At 835, while no additional active cores are to be replaced, method 800 may continue at 840. At 840, execution may continue with the current set of active cores.

In at least some embodiments, the mechanisms described herein may provide a customer or end user the ability to failover to pre-existing, functional, redundant components in the field. This in-field failover capability may be documented and exposed to software, including end-user application software, so that end users can invoke the capability. This capability may provide the ability to recover from a faulty execution resource, such as a failing or sub-standard processing core, without a loss of functionality.

In some embodiments, the requirement for resetting the processor in order to perform an in-field core failover may be avoided by providing a dynamic means of migrating context from a faulty active core to a functional spare either through software intervention or via hardware mechanisms. In some embodiments, the requirement that an end user determine when a component is faulty or is otherwise unsuitable for a given application or for operation in a given end-user environment may be avoided by providing hardware that is able to make such a determination and initiate an in-field core failover automatically. For example, the hardware may make such a determination based on periodically executed self-diagnostics, continuous self-monitoring, or other similar techniques.

While in-field core failover mechanisms are described herein in terms of their application to processing cores, in other embodiments, these mechanisms may be expanded to provide in-field failover to functional, redundant components of other types. In some embodiments, the designs of multicore processors and other complex components on a single die may be made in a modular fashion by including redundant capacity for at least some portions of those components. In such embodiments, different numbers and specific instances of these components may be enabled, disabled, and/or activated during manufacturing to meet different product specifications as to the number and characteristics of the components that are exposed to the end user. In one example, a single die may be designed to include more components than can be activated at the same time due to thermal and/or power limits, with the additional functional, redundant components being deactivated until and unless they are needed to replace an active component in the field. At that point, they may be activated using an in-field core failover mechanism such as those described herein.

The figures described below include detailed examples of architectures and systems to implement embodiments of the hardware components and/or instructions described above. In some embodiments, one or more hardware components and/or instructions described above may be emulated as described in detail below, or may be implemented as software modules.

Example Core Architectures, Processors, and Computer Architectures

Processor cores may be implemented in different ways, for different purposes, and in different processors. For instance, in various embodiments, such cores may include a general purpose in-order core intended for general-purpose computing, a high-performance general purpose out-of-order core intended for general-purpose computing, and/or a special purpose core intended primarily for graphics and/or scientific computing (e.g., high throughput computing). In various embodiments, different processors may include a CPU, including one or more general purpose in-order cores intended for general-purpose computing and/or one or more general purpose out-of-order cores intended for general-purpose computing, and a coprocessor, including one or more special purpose cores intended primarily for graphics and/or scientific computing (e.g., high throughput computing). Such different processors may lead to different computer system architectures, in different embodiments. For example, in some embodiments, a coprocessor may be on a separate chip than a CPU. In other embodiments, a coprocessor may be on a separate die than a CPU, but may be in the same package as the CPU. In some embodiments, a coprocessor may be on the same die as a CPU. In this case, the coprocessor may sometimes be referred to as special purpose logic, which may include integrated graphics and/or scientific logic (e.g., high throughput logic), or as a special purpose core. In some embodiments, a system on a chip may include, on the same die, a CPU as described above (which may be referred to as the application core(s) or application processor(s)), a coprocessor as described above, and additional functionality. Example core architectures, processors, and computer architectures are described below, according to some embodiments.

Example Core Architectures

In-order and Out-of-order Core Block Diagram

Figure 9A:
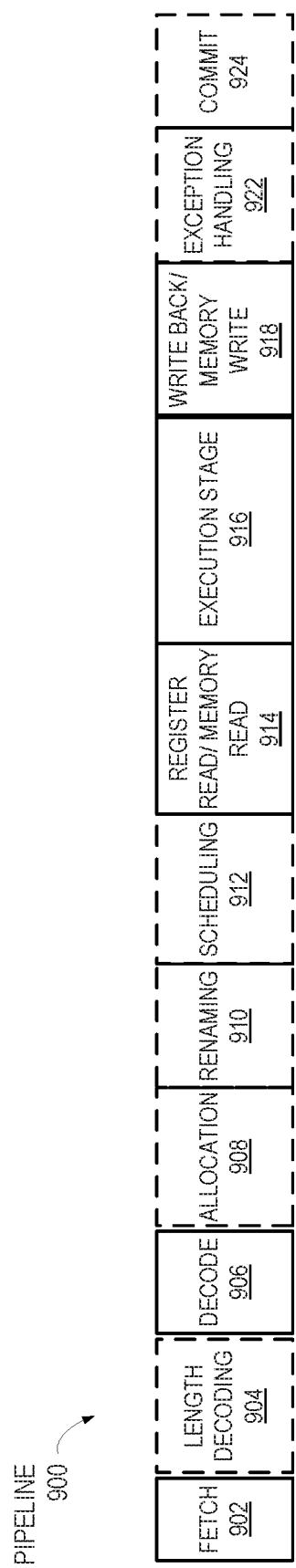
FIG. 9A is a block diagram illustrating an in-order pipeline and a register renaming, out-of-order issue/execution pipeline, according to some embodiments of the present disclosure.
Figure 9B:
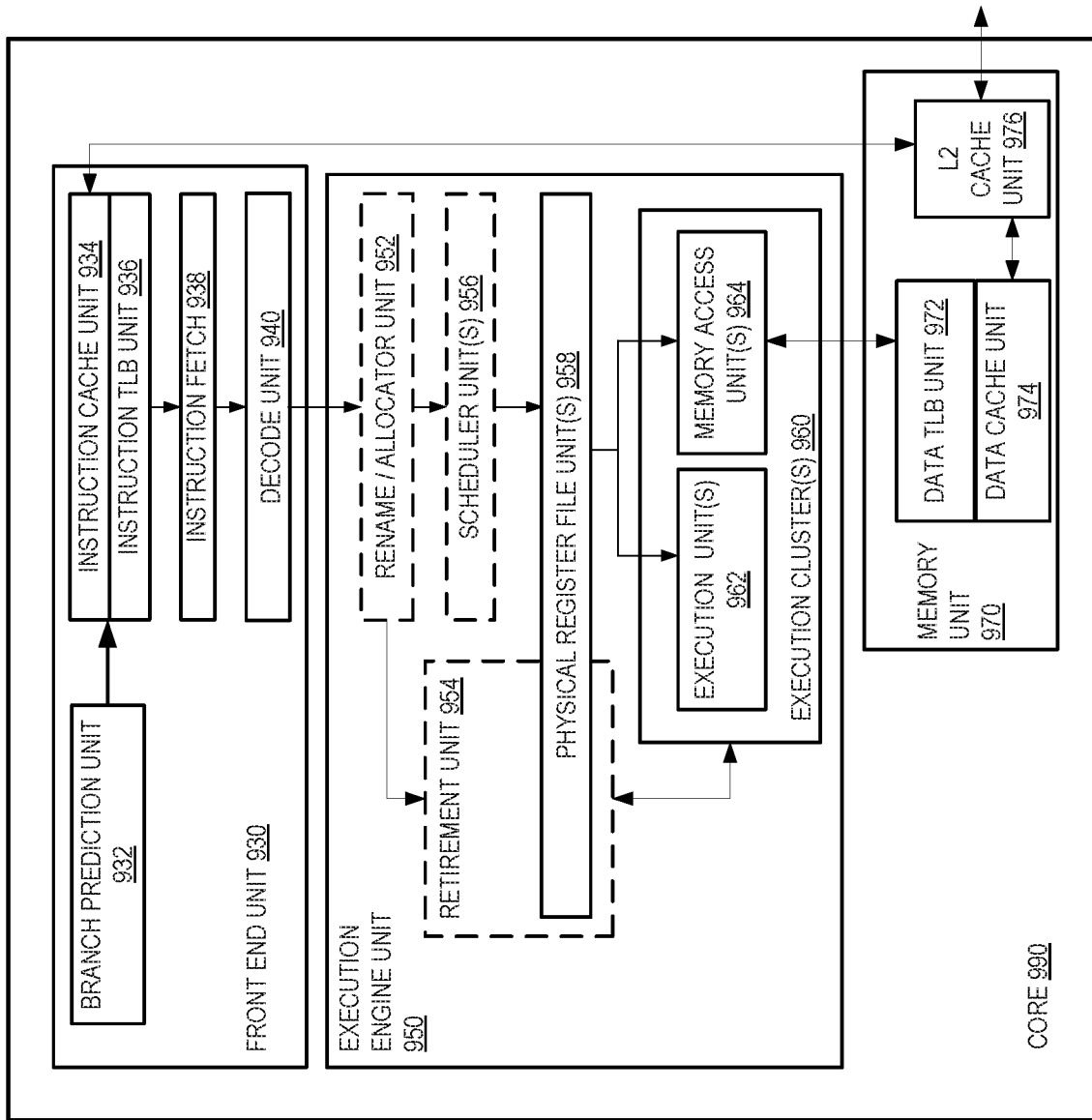
FIG. 9B is a block diagram illustrating an in-order architecture core and register renaming, out-of-order issue/execution logic to be included in a processor, according to some embodiments of the present disclosure.

FIG. 9A is a block diagram illustrating an example in-order pipeline and a register renaming, out-of-order issue/execution pipeline, according to some embodiments. FIG. 9B is a block diagram illustrating an in-order architecture core and register renaming, out-of-order issue/execution logic to be included in a processor, according to some embodiments. The solid lined boxes in FIG. 9A illustrate the in-order pipeline, while the dashed lined boxes illustrate the register renaming, out-of-order issue/execution pipeline. Similarly, the solid lined boxes in FIG. 9B illustrate the in-order architecture logic, while the dashed lined boxes illustrate the register renaming logic and out-of-order issue/execution logic In FIG. 9A, a processor pipeline 900 includes a fetch stage 902, a length decoding stage 904, a decode stage 906, an allocation stage 908, a renaming stage 910, a scheduling stage 912 (also known as a dispatch or issue stage), a register read/memory read stage 914, an execution stage 916, a write back/memory write stage 918, an exception handling stage 922, and a commit stage 924.

In FIG. 9B, arrows denote a coupling between two or more units and the direction of the arrow indicates a direction of data flow between those units. In this example, FIG. 9B illustrates a processor core 990 including a front end unit 930 coupled to an execution engine unit 950, both of which may be coupled to a memory unit 970. The core 990 may be a reduced instruction set computing (RISC) core, a complex instruction set computing (CISC) core, a very long instruction word (VLIW) core, or a core of a hybrid or alternative core type, in different embodiments. In various embodiments, core 990 may be a special-purpose core, such as, for example, a network core, a communication core, a compression engine, a coprocessor core, a general-purpose computing graphics processing unit (GPGPU) core, a graphics core, or another type of special-purpose core.

In this example, front end unit 930 includes a branch prediction unit 932 coupled to an instruction cache unit 934. Instruction cache unit 934 may be coupled to an instruction translation lookaside buffer (TLB) 936. TLB 936 may be coupled to an instruction fetch unit 938, which may be coupled to a decode unit 940. Decode unit 940 may decode instructions, and may generate as an output one or more micro-operations, micro-code entry points, microinstructions, other instructions, or other control signals, which are decoded from, or which otherwise reflect, or are derived from, the original undecoded instructions. Decode unit 940 may be implemented using any of a variety of suitable mechanisms, in different embodiments. Examples of suitable mechanisms may include, but are not limited to, lookup tables, hardware circuitry, programmable logic arrays (PLAs), microcode read only memories (ROMs). In one embodiment, instruction cache unit 934 may be further coupled to a level 2 (L2) cache unit 976 in memory unit 970. In one embodiment, the core 990 may include a microcode ROM or other medium that stores microcode for certain macroinstructions (e.g., within decode unit 940 or elsewhere within the front end unit 930). The decode unit 940 may be coupled to a rename/allocator unit 952 within the execution engine unit 950.

In this example, execution engine unit 950 includes the rename/allocator unit 952, which may be coupled to a retirement unit 954 and a set of one or more scheduler unit(s) 956. Scheduler unit(s) 956 may represent any number of different schedulers of various types, including those that implement reservations stations or those that implement a central instruction window. As illustrated in this example, scheduler unit(s) 956 may be coupled to physical register file unit(s) 958. Each of the physical register file units 958 may represent one or more physical register files, different ones of which store data of one or more different data types including, but not limited to, scalar integer, scalar floating point, packed integer, packed floating point, vector integer, vector floating point, or status data types. One example of the use of a status data type may be an instruction pointer that indicates the address of the next instruction to be executed. In one embodiment, a physical register file unit 958 may include a vector register unit, a write mask register unit, and a scalar register unit (not shown). These register units may provide architectural vector registers, write mask registers (e.g., vector mask registers), and general-purpose registers.

In FIG. 9B, the physical register file unit(s) 958 are shown as being overlapped by the retirement unit 954 to illustrate various ways in which register renaming and out-of-order execution may be implemented. For example, in different embodiments, register renaming and out-of-order execution may be implemented using one or more reorder buffers and one or more retirement register files; using one or more future files, one or more history buffers, and one or more retirement register files; or using register maps and a pool of registers. In general, the architectural registers may be visible from the outside of the processor and/or from a programmer's perspective. The registers are not limited to any particular known type of circuit. Rather, any of a variety of different types of registers may be suitable for inclusion in core 990 as long as they store and provide data as described herein. Examples of suitable registers include, but are not limited to, dedicated physical registers, dynamically allocated physical registers using register renaming, and combinations of dedicated and dynamically allocated physical registers. In the example illustrated in FIG. 9B, retirement unit 954 and physical register file unit(s) 958 are coupled to the execution cluster(s) 960. Each of execution clusters 960 may include a set of one or more execution units 962 and a set of one or more memory access units 964. Execution units 962 may perform various operations (e.g., shifts, addition, subtraction, multiplication) and may operate on various types of data (e.g., scalar floating point, packed integer, packed floating point, vector integer, vector floating point). While some embodiments may include a number of execution units dedicated to specific functions or sets of functions, other embodiments may include only one execution unit, or may include multiple execution units all of which perform all supported functions or operations. In the example illustrated in FIG. 9B, scheduler unit(s) 956, physical register file unit(s) 958, and execution cluster(s) 960 are shown as potentially including a plurality of such units since some embodiments include separate pipelines for certain types of data/operations. For example, some embodiments may include a scalar integer pipeline, a scalar floating point/packed integer/packed floating point/vector integer/vector floating point pipeline, and/or a memory access pipeline, each of which includes its own scheduler unit, physical register file unit, and/or execution cluster. In some embodiments that include a separate memory access pipeline, only the execution cluster of this pipeline includes a memory access unit 964. It should also be understood that where separate pipelines are used, one or more of these pipelines may be out-of-order issue/execution pipelines and the rest may be in-order execution pipelines.

In the example illustrated in FIG. 9B, the set of memory access units 964 may be coupled to the memory unit 970, which includes a data TLB unit 972. Data TLB unit 972 may be coupled to a data cache unit 974, which in turn may be coupled to a level 2 (L2) cache unit 976. In one example embodiment, the memory access units 964 may include a load unit, a store address unit, and a store data unit, each of which may be coupled to the data TLB unit 972 in the memory unit 970. The L2 cache unit 976 may be coupled to one or more other levels of cache and, eventually, to a main memory. While FIG. 9B illustrates an embodiment in which instruction cache unit 934, data cache unit 974, and level 2 (L2) cache unit 976 reside within core 990, in other embodiments one or more caches or cache units may be internal to a core, external to a core, or apportioned internal to and external to a core in different combinations.

In one example embodiment, the register renaming, out-of-order issue/execution core architecture illustrated in FIG. 9B may implement pipeline 900 illustrated in FIG. 9B as follows. The instruction fetch unit 938 may perform the functions of the fetch and length decoding stages 902 and 904. The decode unit 940 may perform the functions of decode stage 906. The rename/allocator unit 952 may perform the functions of the allocation stage 908 and the renaming stage 910. The scheduler unit(s) 956 may perform the functions of the scheduling stage 912. The physical register file unit(s) 958 and the memory unit 970 may, collectively, perform the functions of the register read/memory read stage 914. The execution cluster(s) 960 may perform the functions of the execution stage 916. The memory unit 970 and the physical register file unit(s) 958 may, collectively, perform the functions of the write back/memory write stage 918. In different embodiments, various units (some of which may not be shown) may be involved in performing the functions of the exception handling stage 922. The retirement unit 954 and the physical register file unit(s) 958 may, collectively, perform the functions of the commit stage 924. In different embodiments, core 990 may support one or more instructions sets, including the instruction(s) described herein. For example, in various embodiments, core 990 may support the x86 instruction set (with or without extensions that have been included in recent versions); the MIPS instruction set of MIPS Technologies of Sunnyvale, Calif.; and/or the ARM instruction set of ARM Holdings of Sunnyvale, Calif. (with or without optional additional extensions such as NEON. In one embodiment, core 990 may include logic to support a packed data instruction set extension (e.g., AVX1 or AVX2), thereby allowing the operations used by many multimedia applications to be performed using packed data.

In some embodiments, core 990 may support multithreading (e.g., executing two or more parallel sets of operations or threads), and may do so in a variety of ways. Core 990 may, for example, include support for time sliced multithreading, simultaneous multithreading (in which a single physical core provides a logical core for each of the threads that the physical core is simultaneously executing), or a combination of time sliced and simultaneous multithreading. In one embodiment, for example, core 990 may include support for time sliced fetching and decoding, and for simultaneous multithreading in subsequent pipeline stages, such as in the Intel® Hyperthreading technology.

Figure 10B:
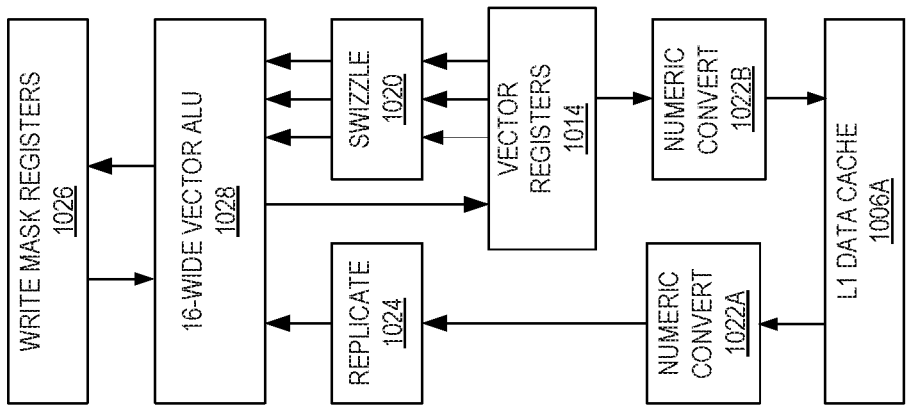
FIGS. 10A and 10B are block diagrams illustrating an example in-order core architecture, according to some embodiments of the present disclosure.
Figure 10A:
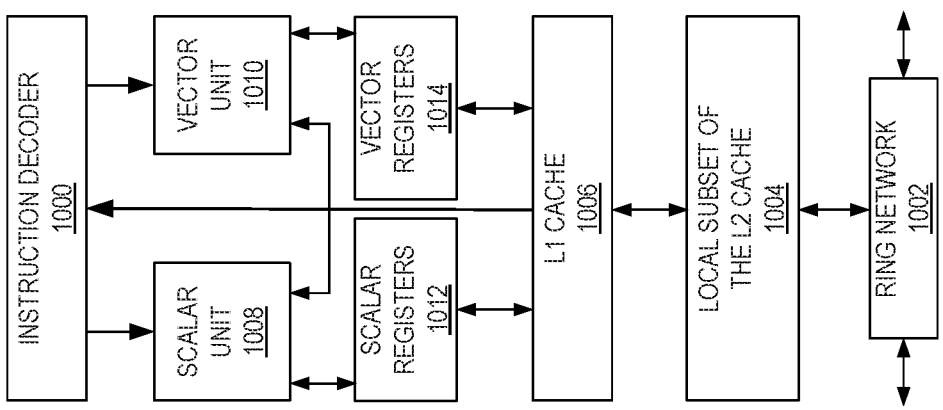

While register renaming is described herein in the context of out-of-order execution, it should be understood that register renaming may be used in an in-order architecture, in some embodiments. While in the example embodiment illustrated in FIG. 9B, core 990 includes separate instruction and data cache units 934 and 974, respectively, and a shared L2 cache unit 976, in other embodiments core 990 may include a single internal cache for both instructions and data, such as, for example, a Level 1 (L1) internal cache, or multiple levels of internal cache. In some embodiments, the system may include a combination of an internal cache and an external cache (e.g., a cache that is external to the core and/or the processor). In other embodiments, all of the caches may be external to the core and/or the processor.
Specific Example In-Order Core Architecture FIGS. 10A and 10B are block diagrams illustrating a more specific example of an in-order core architecture in which a core may be one of several logic blocks (including, for example, other cores of the same type and/or of different types) in a chip. As illustrated in this example, the logic blocks may communicate through a high-bandwidth, on-die interconnect network (e.g., a ring network) with some fixed function logic, memory I/O interfaces, and other necessary I/O logic, depending on the application.

FIG. 10A is a block diagram illustrating a single processor core, along with its connections to an on-die interconnect network (shown as ring network 1002) and to its local subset of a Level 2 (L2) cache 1004, according to some embodiments. In one embodiment, an instruction decoder 1000 may support the x86 instruction set with a packed data instruction set extension. An L1 cache 1006 may allow low-latency accesses to cache memory by the scalar and vector units. In one embodiment (e.g., to simplify the design), a scalar unit 1008 and a vector unit 1010 may use separate register sets (e.g., scalar registers 1012 and vector registers 1014, respectively) and data that is transferred between them may be written to memory and then read back in from level 1 (L1) cache 1006. However, other embodiments may use a different approach. For example, they may include a single register set or may include a communication path that allows data to be transferred between the two register files without being written to memory and read back.

In this example, the local subset of the L2 cache 1004 may be part of a global L2 cache that is divided into separate local subsets, e.g., with one subset per processor core. Each processor core may have a direct access path to its own local subset of the L2 cache 1004. Data read by a processor core may be stored in its L2 cache subset 1004 from which it can be accessed quickly and in parallel with accesses by other processor cores to their own local L2 cache subsets. Data written by a processor core and stored in its own L2 cache subset 1004 may be flushed from other L2 cache subsets, if necessary. In some embodiments, the ring network 1002 may ensure coherency for shared data. The ring network may be bi-directional to allow agents such as processor cores, L2 caches and other logic blocks to communicate with each other within the chip. In one embodiment, each ring datapath may be 1012 bits wide per direction.

FIG. 10B illustrates an expanded view of part of the processor core illustrated in FIG. 10A, according to some embodiments. In this example, FIG. 10B includes an L1 data cache 1006A, which may be part of the L1 cache 1004, as well as more detail regarding the vector unit 1010 and the vector registers 1014. Specifically, the vector unit 1010 may be a 16-wide vector processing unit (VPU) that includes a 16-wide vector ALU 1028. ALU 1028 may be configured to execute one or more of integer, single-precision float, and double-precision float instructions. The VPU may also support swizzling the register inputs (using swizzle unit 1020), numeric conversion (using numeric convert units 1022A and 1022B), and replication (using replication unit 1024) on the memory input. The inclusion of write mask registers 1026 may allow for predicating resulting vector writes.

Figure 11:
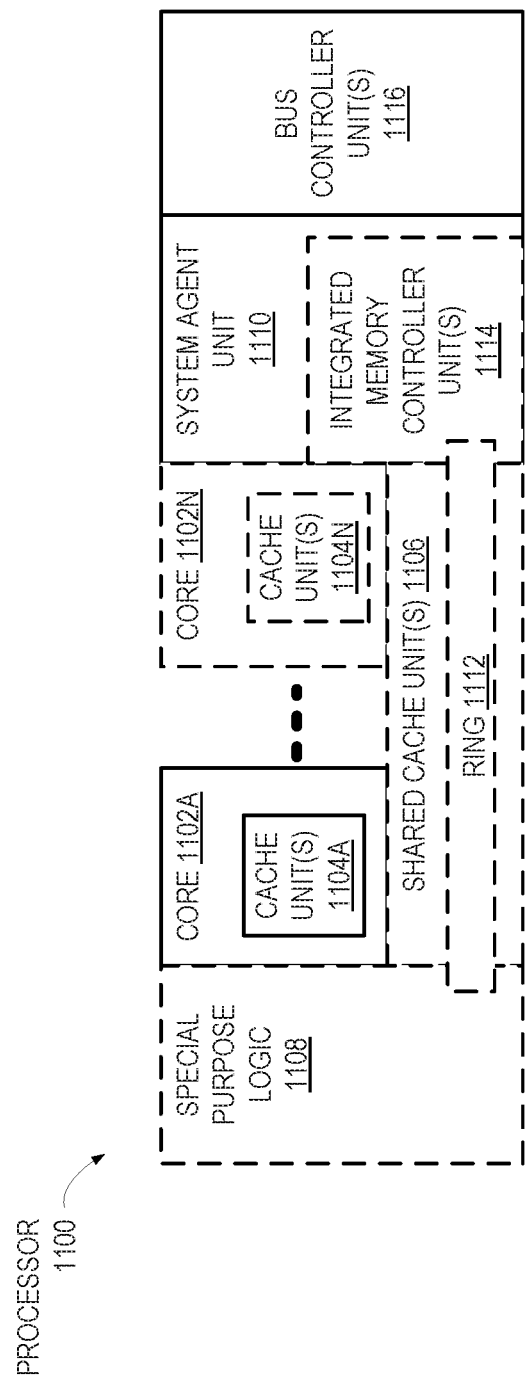
FIG. 11 is a block diagram illustrating a processor, according to some embodiments of the present disclosure.

FIG. 11 is a block diagram illustrating a processor 1100 that may, in some embodiments, include more than one core, an integrated memory controller, and/or may special purpose logic (such as for integrated graphics computing). The solid lined boxes in FIG. 11 illustrate a processor 1100 that includes a single core 1102A, a system agent 1110, and a set of one or more bus controller units 1116. With the optional addition of the dashed lined boxes, an alternative embodiment of processor 1100 includes multiple cores 1102A-1102N, and also includes a set of one or more integrated memory controller unit(s) 1114 within the system agent unit 1110, and special purpose logic 1108. In some embodiments, one or more of cores 1102A-1102N may be similar to processor core 990 illustrated in FIG. 9B or the processor core illustrated in FIGS. 10A and 10B.

In some embodiments, processor 1100 may represent a CPU in which the special purpose logic 1108 includes integrated graphics and/or scientific logic (which may include one or more cores), and in which the cores 1102A-1102N include one or more general purpose cores (e.g., general purpose in-order cores, general purpose out-of-order cores, or a combination of the two). In other embodiments, processor 1100 may represent a coprocessor in which the cores 1102A-1102N include a large number of special purpose cores intended primarily for graphics and/or scientific computing (e.g., high throughput computing). In still other embodiments, processor 1100 may represent a coprocessor in which the cores 1102A-1102N include a large number of general purpose in-order cores. Thus, in different embodiments, the processor 1100 may be a general purpose processor, a coprocessor, or a special purpose processor, such as, for example, a network or communication processor, compression engine, graphics processor, GPGPU (general purpose graphics processing unit), a high-throughput "many integrated core" (MIC) coprocessor (including, for example, 30 or more cores), an embedded processor, or another type of processor. The processor 1100 may be implemented on one chip or on more than one chip, in different embodiments. The processor 1100 may be a part of and/or may be implemented on one or more substrates using any of a number of process technologies, such as, for example, BiCMOS, CMOS, or NMOS.

In the example illustrated in FIG. 11, the memory hierarchy includes one or more levels of cache within each of the cores 1102A-1102N, shown as cache units 1104A-1104N, a set of one or more shared cache units 1106, and external memory (not shown), some or all of which are coupled to the set of integrated memory controller units 1114. The set of shared cache units 1106 may include one or more mid-level caches, such as level 2 (L2) cache, a level 3 (L3) cache, a level 4 (L4) cache, other levels of cache, a last level cache (LLC), and/or combinations thereof. In one embodiment, a ring based interconnect unit 1112 may be used to interconnect the special purpose logic 1108 (which may include integrated graphics logic), the set of shared cache units 1106, and the system agent unit 1110/integrated memory controller unit(s) 1114. In other embodiments, any number of other suitable techniques may be used for interconnecting such units. In one embodiment, coherency may be maintained between one or more cache units 1106 and cores 1102A-1102N.

In some embodiments, one or more of the cores 1102A-1102N may be capable of multithreading. In some embodiments, the system agent 1110 may include circuitry or logic for coordinating and operating cores 1102A-1102N. For example, the system agent unit 1110 may include a power control unit (PCU) and a display unit. The PCU may be or include logic and circuitry for regulating the power state of the cores 1102A-1102N and the special purpose logic 1108 (which may include integrated graphics logic). The display unit may include circuitry or logic for driving one or more externally connected displays.

In various embodiments, the cores 1102A-1102N may be homogenous or heterogeneous in terms of architecture instruction set. That is, two or more of the cores 1102A-1102N may be capable of executing the same instruction set, while others may be capable of executing only a subset of that instruction set or may execute a different instruction set.

Example Computer Architectures

Figure 12:
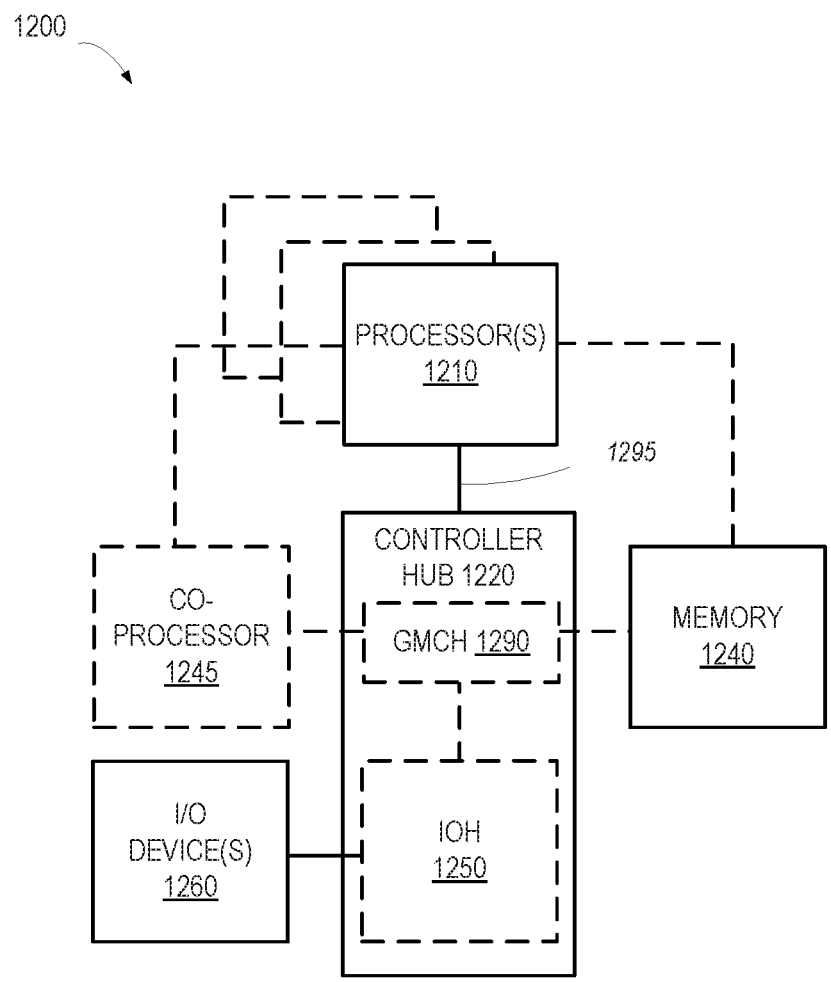
FIGS. 12 through 15 are block diagrams illustrating example computer architectures, according to some embodiments of the present disclosure.
Figure 13:
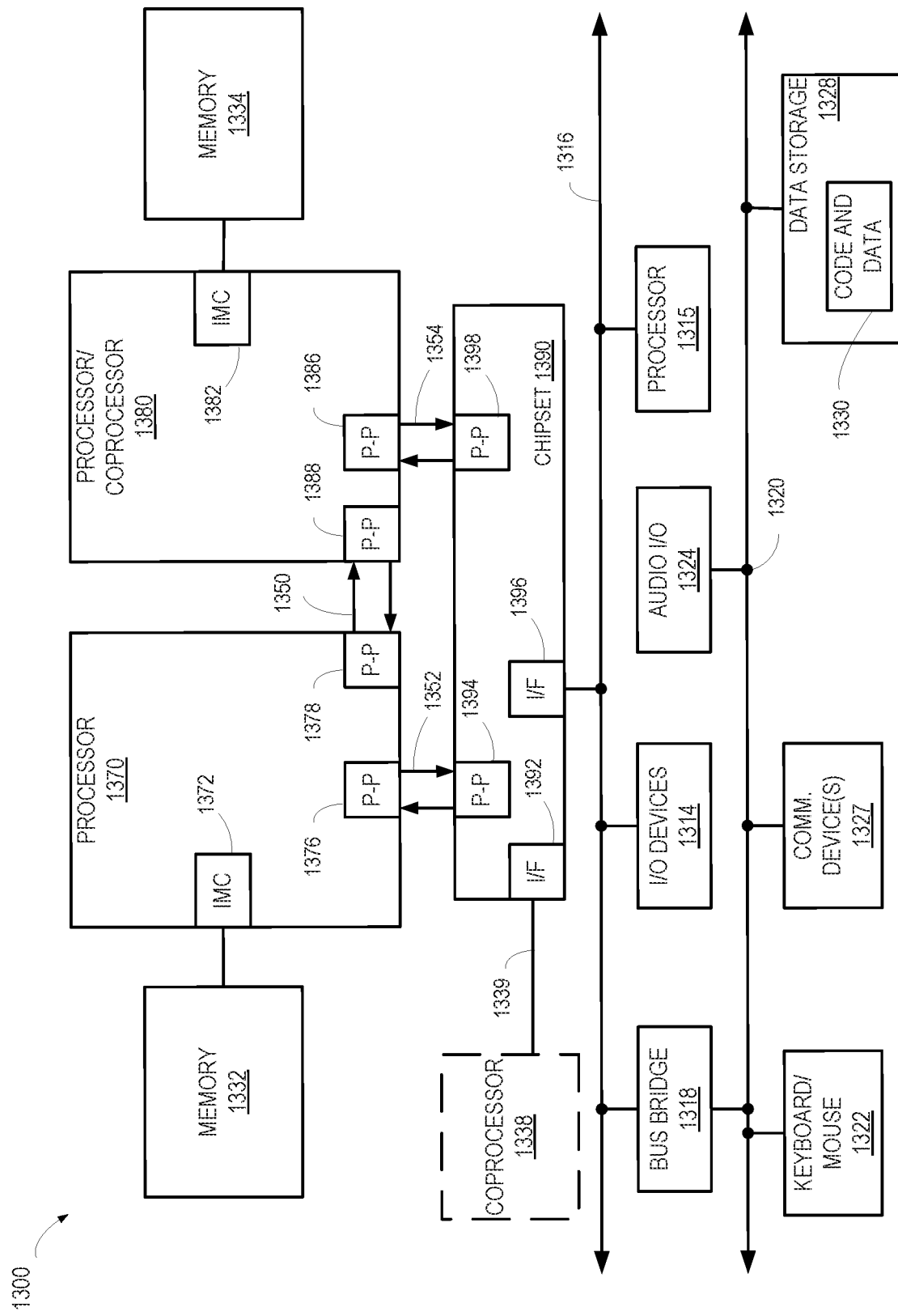
Figure 14:
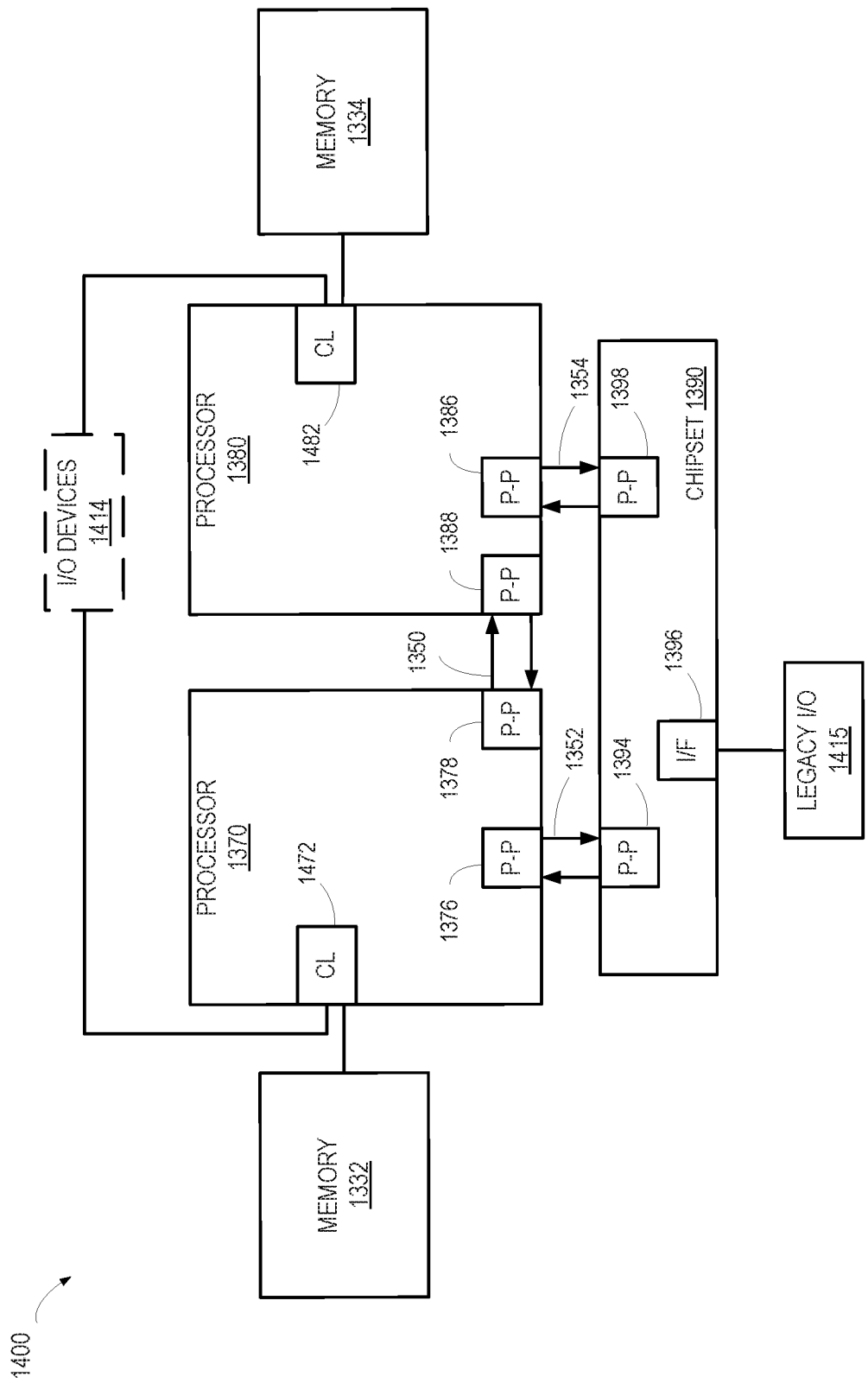
Figure 15:
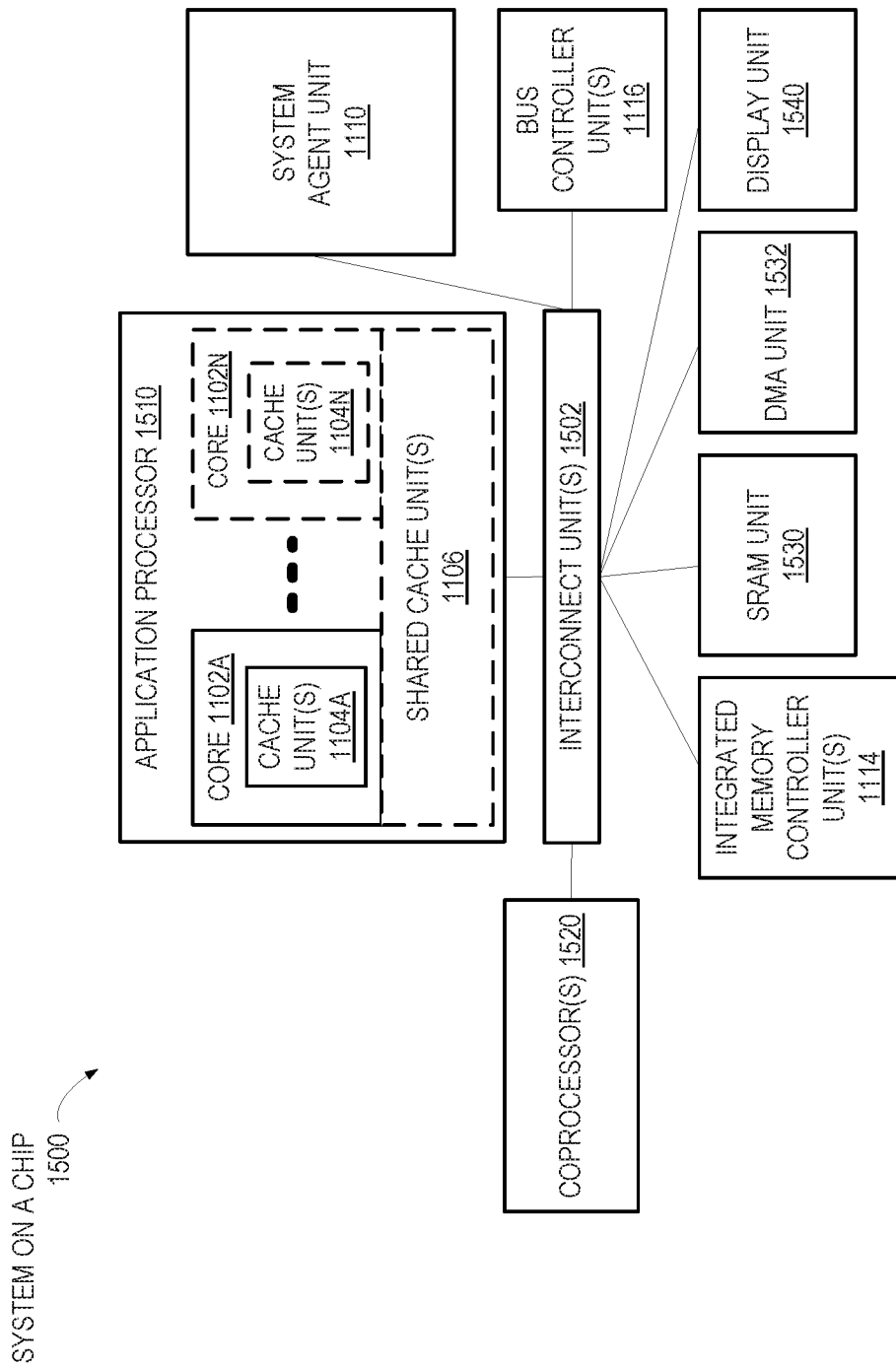

FIGS. 12 through 14 are block diagrams illustrating example systems suitable for the inclusion of one or more processors including, but not limited to, the processors described herein. FIG. 15 illustrates an example system on a chip (SoC) that may include one or more processor cores including, but not limited to, the processor cores described herein. Other system designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable for inclusion of the processors and/or processor cores described herein. In general, a huge variety of systems or electronic devices capable of incorporating a processor and/or other execution logic as disclosed herein are generally suitable for inclusion of the processors and/or processor cores described herein.

FIG. 12 is a block diagram illustrating a system 1200, in accordance with one embodiment of the present disclosure. As illustrated in this example, system 1200 may include one or more processors 1210, which are coupled to a controller hub 1220. In some embodiments, controller hub 1220 may include a graphics memory controller hub (GMCH) 1290 and an Input/Output Hub (IOH) 1250. In some embodiments, GMCH 1290 and IOH 1250 may be on separate chips. In this example, GMCH 1290 may include memory and graphics controllers (not shown) to which are coupled memory 1240 and a coprocessor 1245, respectively. In this example, IOH 1250 couples one or more input/output (I/O) devices 1260 to GMCH 1290. In various embodiments, one or both of the memory and graphics controllers may be integrated within the processor (as described herein), the memory 1240 and/or the coprocessor 1245 may be coupled directly to the processor(s) 1210, or the controller hub 1220 may be implemented in a single chip that includes the IOH 1250.

The optional nature of additional processors 1210 is denoted in FIG. 12 with broken lines. Each processor 1210 may include one or more of the processing cores described herein and may be implemented by a version of the processor 1100 illustrated in FIG. 11 and described herein.

In various embodiments, the memory 1240 may, for example, be dynamic random access memory (DRAM), phase change memory (PCM), or a combination of the two. In at least some embodiments, the controller hub 1220 may communicate with the processor(s) 1210 via a multi-drop bus such as a frontside bus (FSB), a point-to-point interface such as QuickPath Interconnect (QPI), or a similar connection, any one of which may be represented in FIG. 12 as interface 1295.

In one embodiment, the coprocessor 1245 may be a special purpose processor, such as, for example, a high-throughput MIC processor, a network or communication processor, a compression engine, a graphics processor, a GPGPU, an embedded processor, or another type of coprocessor. In one embodiment, controller hub 1220 may include an integrated graphics accelerator (not shown).

In some embodiments, there may be a variety of differences between the physical resources of different ones of the processors 1210. For example, there may be differences between the physical resources of the processors in terms of a spectrum of metrics of merit including architectural characteristics, micro-architectural characteristics, thermal characteristics, power consumption characteristics, and/or other performance-related characteristics.

In one embodiment, a processor 1210 may execute instructions that control data processing operations of a general type. Embedded within the instructions may be coprocessor instructions. The processor 1210 may recognize these coprocessor instructions as being of a type that should be executed by the attached coprocessor 1245. Accordingly, the processor 1210 may issue these coprocessor instructions (or control signals representing coprocessor instructions), on a coprocessor bus or other interconnect, to coprocessor 1245. Coprocessor(s) 1245 may accept and execute the received coprocessor instructions.

FIG. 13 is a block diagram illustrating a first example system 1300, in accordance with one embodiment of the present disclosure. As shown in FIG. 13, multiprocessor system 1300 implements a point-to-point interconnect system. For example, system 1300 includes a first processor 1370 and a second processor 1380 coupled to each other via a point-to-point interconnect 1350. In some embodiments, each of processors 1370 and 1380 may be a version of the processor 1100 illustrated in FIG. 11. In one embodiment, processors 1370 and 1380 may be implemented by respective processors 1210, while coprocessor 1338 may be implemented by a coprocessor 1245. In another embodiment, processors 1370 and 1380 may be implemented by a processor 1210 and a coprocessor 1245, respectively.

Processors 1370 and 1380 are shown including integrated memory controller (IMC) units 1372 and 1382, respectively. Processor 1370 also includes, as part of its bus controller units, point-to-point (P-P) interfaces 1376 and 1378. Similarly, processor 1380 includes P-P interfaces 1386 and 1388. Processors 1370 and 1380 may exchange information via a point-to-point (P-P) interface 1350 using P-P interface circuits 1378 and 1388. As shown in FIG. 13, IMCs 1372 and 1382 couple the processors to respective memories, shown as memory 1332 and memory 1334, which may be portions of a main memory that are locally attached to the respective processors.

Processors 1370 and 1380 may each exchange information with a chipset 1390 via individual P-P interfaces 1352 and 1354 respectively, using point to point interface circuits 1376, 1394, 1386, and 1398. Chipset 1390 may optionally exchange information with the coprocessor 1338 via interface 1392 over a high-performance interface 1339. In one embodiment, the coprocessor 1338 may be a special purpose processor, such as, for example, a high-throughput MIC processor, a network or communication processor, a compression engine, a graphics processor, a GPGPU, an embedded processor, or another type of special purpose processor. In one embodiment, coprocessor 1338 may include a high-performance graphics circuit and interface 1339 may be a high-performance graphics bus.

A shared cache (not shown) may be included in either processor or outside of both processors, yet may be connected with the processors via a P-P interconnect, such that either or both processors' local cache information may be stored in the shared cache if a processor is placed into a low power mode.

Chipset 1390 may be coupled to a first bus 1316 via an interface 1396. In various embodiments, first bus 1316 may be a Peripheral Component Interconnect (PCI) bus, a PCI Express bus, or another third generation I/O interconnect bus, although the scope of the present disclosure is not limited to these specific bus types.

As shown in FIG. 13, various I/O devices 1314 may be coupled to first bus 1316, along with a bus bridge 1318. Bus bridge 1318 may couple first bus 1316 to a second bus 1320. In one embodiment, one or more additional processor(s) 1315, such as one or more coprocessors, high-throughput MIC processors, GPGPU's, accelerators (e.g., graphics accelerators or digital signal processing (DSP) units), field programmable gate arrays, and/or any other processors, may be coupled to first bus 1316. In one embodiment, second bus 1320 may be a low pin count (LPC) bus. Various devices may be coupled to second bus 1320 including, for example, a keyboard and/or mouse 1322, one or more communication devices 1327 and a data storage unit 1328. Data storage unit 1328 may be a disk drive or another mass storage device, which may include instructions/code and data 1330, in one embodiment. In some embodiments, an audio I/O device 1324 may be coupled to the second bus 1320. Note that other architectures are possible. For example, instead of the point-to-point architecture illustrated in FIG. 13, a system may implement a multi-drop bus or another type of interconnect architecture.

FIG. 14 is a block diagram illustrating a second example system 1400, in accordance with one embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370 and 1380 may include integrated memory and I/O control logic ("CL") units 1472 and 1482, respectively. Thus, CL 1472 and CL 1482 may include integrated memory controller units and may also include I/O control logic. FIG. 14 illustrates that not only are the memories 1332 and 1334 coupled to CL 1472 and CL 1482, respectively, but I/O devices 1414 are also coupled to CL 1472 and CL 1482. In this example system, legacy I/O devices 1415 may also be coupled to the chipset 1390 via an interface 1396.

FIG. 15 is a block diagram illustrating a system on a chip (SoC) 1500, in accordance with one embodiment of the present disclosure. Similar elements in FIGS. 15 and 11 bear like reference numerals. Also, dashed lined boxes represent optional features on more advanced SoCs. In FIG. 15, one or more interconnect unit(s) 1502 are coupled to an application processor 1510, which includes a set of one or more cores 1102A-1102N, including respective local cache units 1104A-1104N, and shared cache unit(s) 1106. The interconnect unit(s) 1502 are also coupled to a system agent unit 1110, one or more bus controller unit(s) 1116, one or more integrated memory controller unit(s) 1114, a set of one or more coprocessors 1520, a static random access memory (SRAM) unit 1530, a direct memory access (DMA) unit 1532, and a display unit 1540 for coupling to one or more external displays. In one embodiment, the coprocessor(s) 1520 may include a special purpose processor, such as, for example, a network or communication processor, a compression engine, a GPGPU, a high-throughput MIC processor, an embedded processor, or another type of coprocessor. In another embodiment, the coprocessor(s) 1520 may be a media processor that includes integrated graphics logic, an image processor, an audio processor, and/or a video processor.

In various embodiments, the mechanisms disclosed herein may be implemented in hardware, software, firmware, or a combination of such implementation approaches. Some embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and to generate output information. The output information may be applied to one or more output devices, in known fashion. For purposes of this disclosure, a processing system may include any system that includes a processor, such as, for example, a digital signal processor (DSP), a microcontroller, an application specific integrated circuit (ASIC), or a microprocessor.

In some embodiments, the program code may be implemented in a high level procedural or object oriented programming language to communicate with a processing system. The program code may also be implemented in assembly or machine language, in other embodiments. In fact, the mechanisms described herein are not limited in scope to any particular programming language. In general, the programming language may be a compiled language or an interpreted language.

One or more aspects of at least one embodiment may be implemented by representative instructions stored on a non-transitory, machine-readable medium which represents various logic within the processor, which when read by a machine causes the machine to fabricate logic to perform the techniques described herein. Such representations, sometimes referred to as "IP cores", may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable memories (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off the processor.

Figure 16:
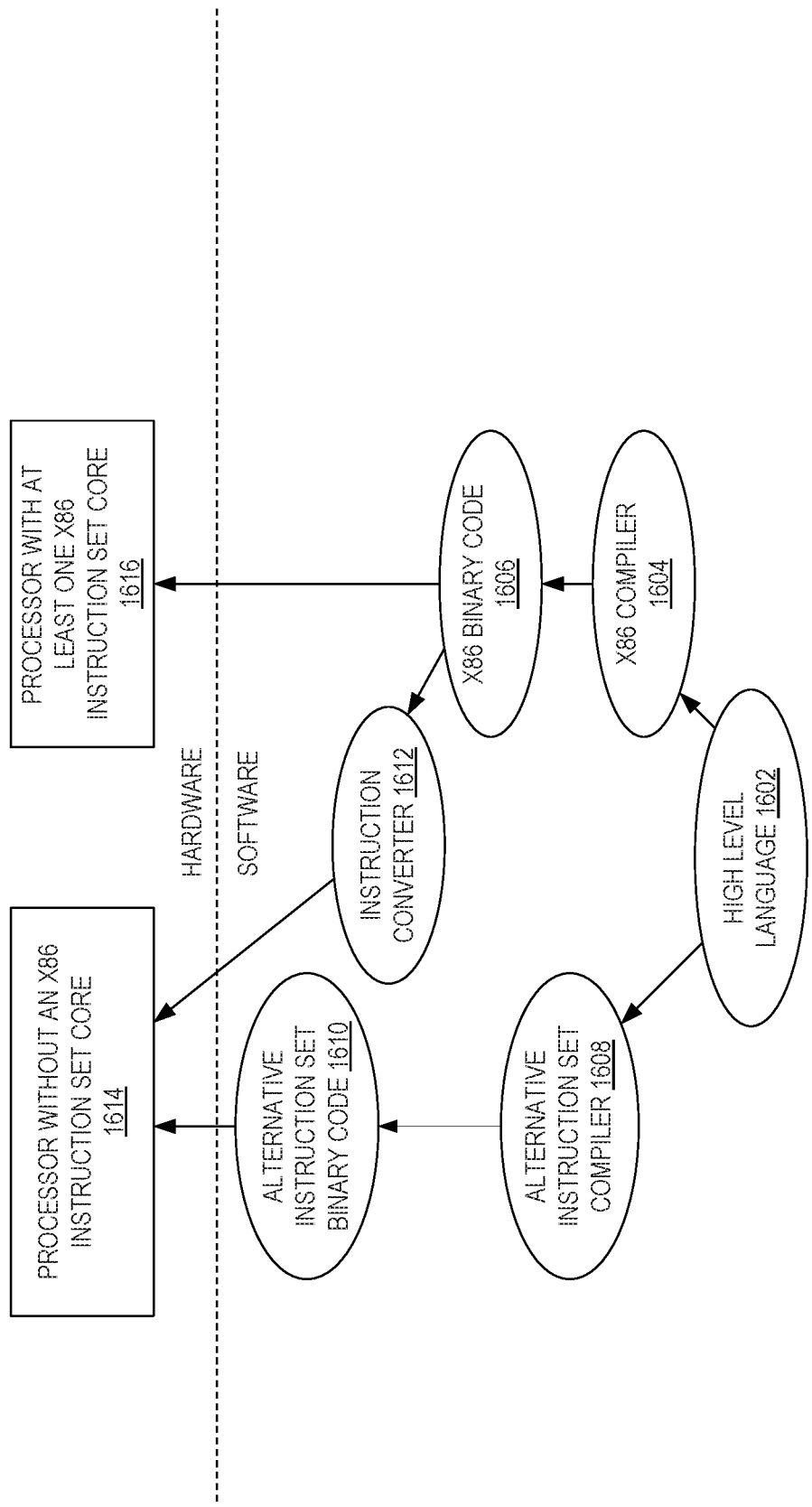
FIG. 16 is a block diagram illustrating the use of a compiler and a software instruction converter to convert binary instructions in a source instruction set to binary instructions in a target instruction set, according to some embodiments of the present disclosure.

FIG. 16 is a block diagram illustrating the use of a compiler and a software instruction converter to convert binary instructions in a source instruction set to binary instructions in a target instruction set, according to some embodiments. In the illustrated embodiment, the instruction converter may be a software instruction converter, although in other embodiments the instruction converter may be implemented in software, firmware, hardware, or various combinations thereof. FIG. 16 illustrates that a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that may be operable to generate x86 binary code 1606 (e.g., object code) that may, with or without additional linkage processing, be executed on the processor with at least one x86 instruction set core 1616. Similarly, FIG. 16 illustrates that the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1612 may be used to convert x86 binary code 1606 into code that may be natively executed by the processor without an x86 instruction set core 1614. This converted code might not be the same as the alternative instruction set binary code 1610; however, the converted code will accomplish the general operation and be made up of instructions from the alternative instruction set. Thus, instruction converter 1612 represents software, firmware, hardware, or a combination thereof that, through emulation, simulation or any other process, allows a processor or other electronic device that does not have an x86 instruction set processor or core to execute x86 binary code 1606.

Thus, techniques for performing one or more instructions according to at least one embodiment are disclosed. While certain example embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Some embodiments of the present disclosure include processor. In at least some of these embodiments, the processor may include a plurality of processing cores, including multiple processing cores to be designated as active cores, and at least one processing core to be designated as a functional spare. The processor may also include an interface to receive, during operation of the processor in an end-user environment, a request to change the designation of at least one of the processing cores. Responsive to the request, the processor may be to store, in a desired cores configuration data structure, data representing a bitmask that reflects the requested change, and to execute a reset sequence. During execution of the reset sequence, the processor may be to activate, dependent on the bitmask, a processing core that was previously designated as a functional spare, or to deactivate, dependent on the bitmask, a processing core that was previously designated as an active core. In any of the above embodiments, the number of processing cores that were previously designated as active cores may be equal to a predetermined maximum allowed number of active cores for the processor. In any of the above embodiments, the number of processing cores that were previously designated as functional spares may be greater than or equal to a predetermined minimum number of functional spares for the processor. In combination with any of the above embodiments, the processor may further include a programmable circuit programmed to indicate which of the plurality of processing cores are enabled for use as active cores or as functional spares, dependent on results of functional testing or characterization performed during manufacturing of the processor. In combination with any of the above embodiments, the processor may further include a programmable circuit programmed to indicate which of the plurality of processing cores are enabled for use as active cores or as functional spares, and the circuitry may include programmable fuses. In combination with any of the above embodiments, the processor may further include a programmable circuit programmed to indicate, for at least one of the plurality of processing cores, results of functional testing performed during manufacturing. In combination with any of the above embodiments, the processor may further include a programmable circuit programmed to indicate, for at least one of the processing cores, results of characterization performed during manufacturing. In combination with any of the above embodiments, the processor may further include a programmable circuit programmed to indicate, for each of the processing cores, results of functional testing and characterization performed during manufacturing of the processor. The programmable circuit may be programmed to indicate that the multiple processing cores designated as active cores are fully functional and meet all specifications. The programmable circuit may be programmed to indicate that the at least one processing core that was previously designated as a functional spare is fully functional and does not meet all specifications. In combination with any of the above embodiments, the processor may further include a programmable circuit programmed to indicate, for each of the processing cores, results of functional testing and characterization performed during manufacturing of the processor. The programmable circuit may be programmed to indicate that the multiple processing cores designated as active cores are fully functional and meet all specifications. The programmable circuit may be programmed to indicate that the at least one processing core that was previously designated as a functional spare is fully functional and meets all specifications. In combination with any of the above embodiments, the desired cores configuration data structure may be contained in a register that is writable during operation of the processor in the end-user environment, and the reset sequence may include a warm reset sequence in which power is maintained for at least a portion of the processor. In combination with any of the above embodiments, the request to change the designation of at least one of the plurality of processing cores may be received from an operating system executing on the processor or from firmware executing on the processor. In combination with any of the above embodiments, the request may be to change the designation of at least one processing core from a designation as a functional spare to a designation as an active core, and the processor may further be to determine, based on the bitmask, that changing the designation of the at least one processing core from a designation as a functional spare to a designation as an active core would result in the number of active cores being greater than a predetermined maximum allowed number of active cores for the processor, and to refrain from changing the designation of the at least one processing core from a designation as a functional spare to a designation as an active core, in response to the determination. In combination with any of the above embodiments, the request may be to change the designation of at least one processing core from a designation as a functional spare to a designation as an active core, and the processor may further be to determine, based on the bitmask, that changing the designation of the at least one processing core from a designation as a functional spare to a designation as an active core would result in the number of active cores being less than or equal to a predetermined maximum allowed number of active cores for the processor, and to change the designation of the at least one processing core from a designation as a functional spare to a designation as an active core, in response to the determination. In combination with any of the above embodiments, the processor may further be to receive, during operation of the processor in the end-user environment, a second request to change a designation of at least two of the plurality of processing cores, to store, in the desired cores configuration data structure in response to the second request, data representing a second bitmask reflecting the second requested change, and to execute, dependent on the second bitmask, a processing core swap sequence. During execution of the processing core swap sequence, the processor may further be to migrate context from a particular processing core that was previously designated as an active core to a particular processing core that was previously designated as a functional spare, to deactivate the particular processing core that was previously designated as an active core, and to activate the particular processing core that was previously designated as a functional spare. In combination with any of the above embodiments, the desired cores configuration data structure may reside in a non-volatile memory external to the processor, and the reset sequence may include a cold reset sequence in which at least a portion of the processor is powered down.

Some embodiments of the present disclosure include a method. In at least some of these embodiments, the method may include receiving, in a multicore processor during operation of the processor in an end-user environment, a request to change a designation of at least one of a plurality of processing cores, the plurality of processing cores including multiple processing cores that were previously designated as active cores and at least one processing core that was previously designated as a functional spare, storing, in a desired cores configuration data structure in response to the request, data representing a bitmask reflecting the requested change, and executing a reset sequence, the executing including activating a processing core that was previously designated as a functional spare or deactivating a processing core that was previously designated as an active core, the activating or deactivating being dependent on the bitmask. In any of the above embodiments, the number of processing cores that were previously designated as active cores may be equal to a predetermined maximum allowed number of active cores for the processor. In combination with any of the above embodiments, the request may be to change the respective designations of two or more processing cores from designations as functional spares to designations as active cores, and executing the reset sequence may include determining, based on the bitmask, that changing the respective designations of the two or more processing cores from designations as functional spares to designations as active cores would result in the number of active cores being greater than a predetermined maximum allowed number of active cores for the processor, and refraining from changing the respective designation of at least one of the two or more processing cores from a designation as a functional spare to a designation as an active cores, in response to the determining. In combination with any of the above embodiments, the request may be to change the respective designations of two or more processing cores from designations as functional spares to designations as active cores, and executing the reset sequence may include determining, based on the bitmask, that changing the respective designations of the two or more processing cores from designations as functional spares to designations as active cores would result in the number of active cores being less than or equal to a predetermined maximum allowed number of active cores for the processor, and changing the respective designation of at least one of the two or more processing cores from a designation as a functional spare to a designation as an active cores, in response to the determining. In any of the above embodiments, the number of processing cores that were previously designated as functional spares may be greater than or equal to a predetermined minimum number of functional spares for the processor. In combination with any of the above embodiments, executing the reset sequence may include executing a warm reset sequence during which power is maintained for at least a portion of the processor. In combination with any of the above embodiments, receiving a request to change the designation of at least one of the plurality of processing cores may include receiving the request from an operating system executing on the processor or from firmware executing on the processor. In combination with any of the above embodiments, executing the reset sequence may include accessing a programmable circuit that was programmed, during manufacturing of the processor, to indicate which of the plurality of processing cores are enabled for use as active cores or as functional spares. In combination with any of the above embodiments, executing the reset sequence may include accessing a programmable circuit that was programmed, during manufacturing of the processor, to indicate which of the plurality of processing cores are enabled for use as active cores or as functional spares, and the programmable circuit may include programmable fuses. In combination with any of the above embodiments, executing the reset sequence may include accessing a programmable circuit that was programmed, during manufacturing of the processor, to indicate, for at least one of the plurality of processing cores, results of functional testing performed during manufacturing. In combination with any of the above embodiments, executing the reset sequence may include accessing a programmable circuit that was programmed, during manufacturing of the processor, to indicate, for at least one of the plurality of processing cores, results of characterization performed during manufacturing. In combination with any of the above embodiments, executing the reset sequence may include accessing a programmable circuit that was programmed, during manufacturing of the processor, to indicate, for each of the plurality of processing cores, results of functional testing and characterization performed during manufacturing of the processor.

The programmable circuit may be programmed to indicate that the multiple processing cores that were previously designated as active cores are fully functional and meet all specifications. The programmable circuit may be programmed to indicate that the at least one processing core that was designated as a functional spare is fully functional and does not meet all specifications. In combination with any of the above embodiments, executing the reset sequence may include accessing a programmable circuit that was programmed, during manufacturing of the processor, to indicate, for each of the plurality of processing cores, results of functional testing and characterization performed during manufacturing of the processor. The programmable circuit may be programmed to indicate that the multiple processing cores that were previously designated as active cores are fully functional and meet all specifications. The programmable circuit may be programmed to indicate that at least one processing core that was previously designated as a functional spare is fully functional and meets all specifications. In combination with any of the above embodiments, the desired cores configuration data structure may be resident in a non-volatile memory external to the processor, and executing the reset sequence may include executing a cold reset sequence during at least a portion of the multicore processor is powered down. In combination with any of the above embodiments, the method may further include receiving, during operation of the processor in the end-user environment, a second request to change a designation of at least two of the plurality of processing cores, storing, in the desired cores configuration data structure in response to the second request, data representing a second bitmask reflecting the second requested change, migrating context from a particular processing core that was previously designated as an active core to a particular processing core that was previously designated as a functional spare, deactivating the particular processing core that was previously designated as an active core, and activating the particular processing core that was previously designated as a functional spare.

Some embodiments of the present disclosure include a system-on-a-chip. In at least some of these embodiments, the system-on-a-chip may include a plurality of processing cores, including multiple processing cores to be designated as active cores, and at least one processing core to be designated as a functional spare. The system-on-a-chip may include a memory that includes a desired cores configuration data structure, a power control unit, and an interface to receive, during operation of the system-on-a-chip in an end-user environment, a request to change the designation of at least one of the plurality of processing cores. Responsive to the request, the power control unit may be to store, in the desired cores configuration data structure, data representing a bitmask that reflects the requested change, and to execute a reset sequence. During execution of the reset sequence, the power control unit may be to activate, dependent on the bitmask, a processing core that was previously designated as a functional spare, or to deactivate, dependent on the bitmask, a processing core that was previously designated as an active core. In any of the above embodiments, the number of processing cores that were previously designated as active cores may be equal to a predetermined maximum allowed number of active cores for the system-on-a-chip. In any of the above embodiments, the number of processing cores that were previously designated as functional spares may be greater than or equal to a predetermined minimum number of functional spares for the system-on-a-chip. In combination with any of the above embodiments, the system-on-a-chip may further include a programmable circuit programmed to indicate which of the plurality of processing cores are enabled for use as active cores or as functional spares, dependent on results of functional testing or characterization performed during manufacturing of the system-on-a-chip. In combination with any of the above embodiments, the system-on-a-chip may further include a programmable circuit programmed to indicate which of the plurality of processing cores are enabled for use as active cores or as functional spares, and the circuitry may include programmable fuses. In combination with any of the above embodiments, the system-on-a-chip may further include a programmable circuit programmed to indicate, for at least one of the plurality of processing cores, results of functional testing performed during manufacturing. In combination with any of the above embodiments, the system-on-a-chip may further include a programmable circuit programmed to indicate, for at least one of the plurality of processing cores, results of characterization performed during manufacturing. In combination with any of the above embodiments, the system-on-a-chip may further include a programmable circuit programmed to indicate, for each of the plurality of processing cores, results of functional testing and characterization performed during manufacturing of the system-on-a-chip. The programmable circuit may be programmed to indicate that the multiple processing cores that were previously designated as active cores are fully functional and meet all specifications. The programmable circuit may be programmed to indicate that the at least one processing core that was previously designated as a functional spare is fully functional and does not meet all specifications. In combination with any of the above embodiments, the system-on-a-chip may further include a programmable circuit programmed to indicate, for each of the plurality of processing cores, results of functional testing and characterization performed during manufacturing of the system-on-a-chip. The programmable circuit may be programmed to indicate that the multiple processing cores that were previously designated as active cores are fully functional and meet all specifications. The programmable circuit may be programmed to indicate that the at least one processing core that was previously designated as a functional spare is fully functional and meets all specifications. In combination with any of the above embodiments, the power control circuit may be further to receive, during operation of the system-on-a-chip in the end-user environment, a second request to change a designation of at least two of the plurality of processing cores, to store, in the desired cores configuration data structure in response to the second request, data representing a second bitmask reflecting the second requested change, and to execute, dependent on the second bitmask, a processing core swap sequence. During execution of the processing core swap sequence, the power control unit may be further to migrate context from a particular processing core that was previously designated as an active core to a particular processing core that was previously designated as a functional spare, to deactivate the particular processing core that was previously designated as an active core, and to activate the particular processing core that was previously designated as a functional spare. In combination with any of the above embodiments, the desired cores configuration data structure may be contained in a register that is writable during operation of the system-on-a-chip in the end-user environment, and the reset sequence may include a warm reset sequence in which power is maintained for at least a portion of the system-on-a-chip. In combination with any of the above embodiments, the plurality of processing cores may be processing cores within a multicore processor, the memory that includes the desired cores configuration data structure may be a non-volatile memory external to the multicore processor, and the reset sequence may include a cold reset sequence in which at least a portion of the multicore processor is powered down. In combination with any of the above embodiments, the request may be to change the designation of at least one processing core from a designation as a functional spare to a designation as an active core, and the power control unit may be further to determine, based on the bitmask, that changing the designation of the at least one processing core from a designation as a functional spare to a designation as an active core would result in the number of active cores being greater than a predetermined maximum allowed number of active cores for the system-on-a-chip, and to refrain from changing the designation of the at least one processing core from a designation as a functional spare to a designation as an active core, in response to the determination. In combination with any of the above embodiments, the request may be to change the designation of at least one processing core from a designation as a functional spare to a designation as an active core, and the power control unit may be further to determine, based on the bitmask, that changing the designation of the at least one processing core from a designation as a functional spare to a designation as an active core would result in the number of active cores being less than or equal to a predetermined maximum allowed number of active cores for the system-on-a-chip, and to change the designation of the at least one processing core from a designation as a functional spare to a designation as an active core, in response to the determination. In combination with any of the above embodiments, the request to change the designation of at least one of the plurality of processing cores may be received from an operating system executing on the system-on-a-chip or from firmware executing on the system-on-a-chip.

Some embodiments of the present disclosure include a system. In at least some of these embodiments, the system may include means for receiving, during operation of the system in an end-user environment, a request to change a designation of at least one of a plurality of processing cores, the plurality of processing cores including multiple processing cores that were previously designated as active cores and at least one processing core that was previously designated as a functional spare, means for storing, in a desired cores configuration data structure in response to the request, data representing a bitmask reflecting the requested change, and means for executing a reset sequence, the executing including activating a processing core that was previously designated as a functional spare or deactivating a processing core that was previously designated as an active core, the activating or deactivating being dependent on the bitmask. In any of the above embodiments, the number of processing cores that were previously designated as active cores may be equal to a predetermined maximum allowed number of active cores for the system. In combination with any of the above embodiments, the request may be to change the respective designations of two or more processing cores from designations as functional spares to designations as active cores, and the means for executing the reset sequence may include means for determining, based on the bitmask, that changing the respective designations of the two or more processing cores from designations as functional spares to designations as active cores would result in the number of active cores being greater than a predetermined maximum allowed number of active cores for the system, and means for refraining from changing the respective designation of at least one of the two or more processing cores from a designation as a functional spare to a designation as an active cores, in response to the determining. In combination with any of the above embodiments, the request may be to change the respective designations of two or more processing cores from designations as functional spares to designations as active cores, and the means for executing the reset sequence may include means for determining, based on the bitmask, that changing the respective designations of the two or more processing cores from designations as functional spares to designations as active cores would result in the number of active cores being less than or equal to a predetermined maximum allowed number of active cores for the system, and means for changing the respective designation of at least one of the two or more processing cores from a designation as a functional spare to a designation as an active cores, in response to the determining. In any of the above embodiments, the number of processing cores that were previously designated as functional spares may be greater than or equal to a predetermined minimum number of functional spares for the system. In combination with any of the above embodiments, the means for executing the reset sequence may include means for executing a warm reset sequence during which power is maintained for at least a portion of the system. In combination with any of the above embodiments, the means for receiving a request to change the designation of at least one of the plurality of processing cores may include means for receiving the request from an operating system executing on the system or from firmware executing on the system. In combination with any of the above embodiments, the means for executing the reset sequence may include means for accessing a programmable circuit that was programmed, during manufacturing of the system, to indicate which of the plurality of processing cores are enabled for use as active cores or as functional spares. In combination with any of the above embodiments, the means for executing the reset sequence may include means for accessing a programmable circuit that was programmed, during manufacturing of the system, to indicate which of the plurality of processing cores are enabled for use as active cores or as functional spares, and the circuitry may include programmable fuses. In combination with any of the above embodiments, the means for executing the reset sequence may include means for accessing a programmable circuit that was programmed, during manufacturing of the system, to indicate, for at least one of the plurality of processing cores, results of functional testing performed during manufacturing. In combination with any of the above embodiments, the means for executing the reset sequence may include means for accessing a programmable circuit that was programmed, during manufacturing of the system, to indicate, for at least one of the plurality of processing cores, results of characterization performed during manufacturing. In combination with any of the above embodiments, the means for executing the reset sequence may include accessing a programmable circuit that was programmed, during manufacturing of the system, to indicate, for each of the plurality of processing cores, results of functional testing and characterization performed during manufacturing of the system. The programmable circuit may be programmed to indicate that the multiple processing cores that were previously designated as active cores are fully functional and meet all specifications. The programmable circuit may be programmed to indicate that the at least one processing core that was previously designated as a functional spare is fully functional and does not meet all specifications. In combination with any of the above embodiments, the means for executing the reset sequence may include means for accessing a programmable circuit that was programmed, during manufacturing of the system, to indicate, for each of the processing cores, results of functional testing and characterization performed during manufacturing of the system. The programmable circuit may be programmed to indicate that the multiple processing cores that were previously designated as active cores are fully functional and meet all specifications. The programmable circuit may be programmed to indicate that at least one processing core that was previously designated as a functional spare is fully functional and meets all specifications. In combination with any of the above embodiments, the desired cores configuration data structure may be resident in a non-volatile memory external to the system, and the means for executing the reset sequence may include means for executing a cold reset sequence during at least a portion of the system is powered down. In combination with any of the above embodiments, the system may further include means for receiving, during operation of the system in the end-user environment, a second request to change a designation of at least two of the plurality of processing cores, means for storing, in the desired cores configuration data structure in response to the second request, data representing a second bitmask reflecting the second requested change, means for migrating context from a particular processing core that was previously designated as an active core to a particular processing core that was previously designated as a functional spare, means for deactivating the particular processing core that was previously designated as an active core, and means for activating the particular processing core that was previously designated as a functional spare.

What is claimed is:

1. A processor, comprising:
a plurality of processing cores, including:
multiple processing cores to be designated as active cores;
at least one processing core to be designated as a functional spare; and
an interface to receive, during an execution of program code on the processor in an end-user environment, a request to change a designation of at least one of the plurality of processing cores;
wherein the processor is to:
responsive to the request, store, in a desired cores configuration data structure, data representing a bitmask that reflects the requested change; and
execute a reset sequence in response to the data being stored in the desired cores configuration data structure, wherein the reset sequence when executed is to cause the processor to:
activate, dependent on the bitmask, a processing core that was previously designated as a functional spare; or
deactivate, dependent on the bitmask, a processing core that was previously designated as an active core.

2. The processor of claim 1, wherein:
the number of processing cores that were previously designated as active cores is equal to a predetermined maximum allowed number of active cores for the processor.

3. The processor of claim 1, wherein:
the number of processing cores that were previously designated as functional spares is greater than or equal to a predetermined minimum number of functional spares for the processor.

4. The processor of claim 1, further comprising:
a programmable circuit programmed to indicate which of the plurality of processing cores are enabled for use as active cores or as functional spares, dependent on results of functional testing or characterization performed during manufacturing of the processor.

5. The processor of claim 1, wherein:
the processor further comprises a programmable circuit programmed to indicate, for each of the plurality of processing cores, results of functional testing and characterization performed during manufacturing of the processor;
the programmable circuit is programmed to indicate that the multiple processing cores that were previously designated as active cores are fully functional and meet all specifications;
the programmable circuit is programmed to indicate that the at least one processing core that was previously designated as a functional spare is fully functional and does not meet all specifications for which a characterization is performed.

6. The processor of claim 1, wherein:
the desired cores configuration data structure is contained in a register that is writable during operation of the processor in the end-user environment;
the reset sequence comprises a warm reset sequence in which power is maintained for at least a portion of the processor.

7. The processor of claim 1, wherein:
the request to change the designation of at least one of the plurality of processing cores is received from an operating system executing on the processor or from firmware executing on the processor.

8. A method comprising, in a multicore processor:
receiving, during an execution of program code on the multicore processor in an end-user environment, a request to change respective designations of two or more processing cores of a plurality of processing cores from designations as functional spares to designations as active cores, the plurality of processing cores including multiple processing cores that were previously designated as active cores and at least two processing cores that were previously designated as functional spares;
storing, in desired cores configuration data structure in response to the request, data representing a bitmask reflecting the requested change;
executing a reset sequence, including:
  determining, based on the bitmask, that changing the respective designations of the two or more processing cores from designations as functional spares to designations as active cores would result in a number of active cores being greater than a predetermined maximum allowed number of active cores for the processor; and
  refraining from changing the respective designation of at least one of the two or more processing cores from a designation as a functional spare to a designation as an active core based on the determining; and
  responsive to executing the reset sequence, activating a processing core previously designated as a functional spare and deactivating a processing core previously designated as an active core, the activating or deactivating being dependent on the bitmask.

9. The method of claim 8, wherein: a number of processing cores that were previously designated as active cores is equal to the predetermined maximum allowed number of active cores for the processor.

10. The method of claim 8, wherein: a number of processing cores that were previously designated as functional spares is greater than or equal to a predetermined minimum number of functional spares for the processor.

11. The method of claim 8, wherein:
executing the reset sequence comprises executing a warm reset sequence during which power is maintained for at least a portion of the processor.

12. The method of claim 8, wherein: receiving the request to change the respective designations of the two or more processing cores of the plurality of processing cores comprises receiving the request from an operating system executing on the processor or from firmware executing on the processor.

13. A system-on-a-chip, comprising:
a plurality of processing cores, including:
  multiple processing cores to be designated as active cores;
  at least one processing core to be designated as a functional spare;
a memory comprising a desired cores configuration data structure; a power control unit; and
an interface to receive, during an execution of program code on the system-on-a-chip in an end-user environment, a request to change a designation of at least one of the plurality of processing cores;
wherein the power control unit is to:
  responsive to the request, store, in the desired cores configuration data structure, data representing a bitmask that reflects the requested change; and
  responsive to the data being stored in the desired cores configuration data structure, execute a reset sequence, wherein the reset sequence when executed is to cause the power control unit to:
    activate, dependent on the bitmask, a processing core that was previously designated as a functional spare; or
    deactivate, dependent on the bitmask, a processing core that was previously designated as an active core.

14. The system-on-a-chip of claim 13, wherein:
the number of processing cores that were previously designated as active cores is equal to a predetermined maximum allowed number of active cores for the system-on-a-chip.

15. The system-on-a-chip of claim 13, wherein:
the number of processing cores that were previously designated as functional spares is greater than or equal to a predetermined minimum number of functional spares for the system-on-a-chip.

16. The system-on-a-chip of claim 13, further comprising:
a programmable circuit programmed to indicate which of the plurality of processing cores are enabled for use as active cores or as functional spares, dependent on results of functional testing or characterization performed during manufacturing of the system-on-a-chip.

17. The system-on-a-chip of claim 13, wherein the power control unit is further to:
receive, during operation of the system-on-a-chip in the end-user environment, a second request to change a designation of at least two of the plurality of processing cores;
store, in the desired cores configuration data structure in response to the second request, data representing a second bitmask reflecting the second requested change;

execute, dependent on the second bitmask, a processing core swap sequence;

wherein, during execution of the processing core swap sequence, the power control unit is further to:

migrate context from a particular processing core that was previously designated as an active core to a particular processing core that was previously designated as a functional spare;

deactivate the particular processing core that was previously designated as an active core; and activate the particular processing core that was previously designated as a functional spare.

18. The system-on-a-chip of claim 13, wherein:

the desired cores configuration data structure is contained in a register that is writable during operation of the system-on-a-chip in the end-user environment;

the reset sequence comprises a warm reset sequence in which power is maintained for at least a portion of the system-on-a-chip.

19. The system-on-a-chip of claim 13, wherein:

the plurality of processing cores are processing cores within a multicore processor;

the memory comprising the desired cores configuration data structure is a non-volatile memory external to the multicore processor;

the reset sequence comprises a cold reset sequence in which at least a portion of the multicore processor is powered down.

* * * * *